US012333996B2

(12) United States Patent
Kim et al.

(10) Patent No.: US 12,333,996 B2
(45) Date of Patent: Jun. 17, 2025

(54) DISPLAY MODULE AND DRIVING METHOD OF DISPLAY MODULE

(71) Applicants: SAMSUNG ELECTRONICS CO., LTD., Suwon-si (KR); RESEARCH & BUSINESS FOUNDATION SUNGKYUNKWAN UNIVERSITY, Suwon-si (KR)

(72) Inventors: Jinho Kim, Suwon-si (KR); Yong-Sang Kim, Suwon-si (KR); Sangmin Shin, Suwon-si (KR); Donggun Oh, Suwon-si (KR); Jongsu Oh, Suwon-si (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 17/957,824

(22) Filed: Sep. 30, 2022

(65) Prior Publication Data

US 2023/0024912 A1 Jan. 26, 2023

Related U.S. Application Data

(63) Continuation of application No. PCT/KR2021/004650, filed on Apr. 13, 2021.

(30) Foreign Application Priority Data

Apr. 16, 2020 (KR) ........................ 10-2020-0045979

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2300/0452* (2013.01);
(Continued)

(58) Field of Classification Search
CPC ................... G09G 3/32; G09G 3/3233; G09G 2300/0452; G09G 2300/0852;
(Continued)

(56) References Cited

U.S. PATENT DOCUMENTS 7,167,169 B2 1/2007 Libsch et al.
7,183,719 B2 2/2007 Yang
(Continued)

FOREIGN PATENT DOCUMENTS

JP 2004-361915 A 12/2004
KR 10-0780321 B1 11/2007
(Continued)

OTHER PUBLICATIONS

Communication dated Jul. 26, 2021, issued by the International Searching Authority in counterpart International Application No. PCT/KR2021/004650 (PCT/ISA/210 and PCT/ISA/237).
(Continued)

*Primary Examiner* — Jason M Mandeville
(74) *Attorney, Agent, or Firm* — Sughrue Mion, PLLC

(57) ABSTRACT

A display module may include a plurality of pixels, wherein each of the plurality of pixels includes a plurality of sub-pixels of different colors that are disposed in a matrix form. Each of the plurality of subpixels includes an inorganic light emitting element, a constant current generator which provides a constant current to the inorganic light emitting element, and a pulse width modulation (PWM) circuit which includes a first depletion mode driving transistor, and controls a time during which the constant current flows through the inorganic light emitting element based on a PWM data
(Continued)

100 voltage applied to a gate terminal of the first depletion mode driving transistor and a threshold voltage of the first depletion mode driving transistor.

19 Claims, 27 Drawing Sheets

(52) U.S. Cl.
CPC ............... *G09G 2300/0852* (2013.01); *G09G 2310/066* (2013.01); *G09G 2320/0242* (2013.01); *G09G 2320/045* (2013.01); *G09G 2320/0633* (2013.01); *G09G 2320/064* (2013.01)

(58) Field of Classification Search
CPC ..... G09G 2320/0242; G09G 2320/045; G09G 2320/0633; G09G 2320/064; G09G 2310/066
USPC ........................................................... 345/55
See application file for complete search history.

(56) References Cited

U.S. PATENT DOCUMENTS

| | | | |
|---|---|---|---|
| 7,808,497 | B2 | 10/2010 | Lo et al. |
| 7,888,681 | B2 | 2/2011 | Yamazaki et al. |
| 8,115,704 | B2 | 2/2012 | Smith et al. |
| 8,299,983 | B2 | 10/2012 | Levey et al. |
| 9,305,494 | B2 | 4/2016 | Shim et al. |
| 9,349,313 | B2 | 5/2016 | Kawae et al. |
| 9,373,281 | B2 | 6/2016 | Wu et al. |
| 10,229,939 | B2 | 3/2019 | Takahashi |
| 10,701,783 | B2 | 6/2020 | Umezawa et al. |
| 10,706,766 | B2 | 7/2020 | Kim et al. |
| 10,713,996 | B2 | 7/2020 | Kim et al. |
| 11,257,428 | B2 * | 2/2022 | Cai ...................... G09G 3/3233 |
| 2016/0232848 | A1 * | 8/2016 | Meng ................... G09G 3/3258 |
| 2017/0018229 | A1 * | 1/2017 | Zhang .................. G09G 3/3233 |
| 2017/0116919 | A1 * | 4/2017 | Ma .................... G02F 1/136213 |
| 2017/0263183 | A1 | 9/2017 | Lin et al. |
| 2018/0075798 | A1 | 3/2018 | Nho et al. |
| 2018/0301080 | A1 * | 10/2018 | Shigeta .................... G09G 3/32 |
| 2020/0111403 | A1 * | 4/2020 | Kim ...................... H01L 25/167 |

FOREIGN PATENT DOCUMENTS

| | | | |
|---|---|---|---|
| KR | 10-2011-0074986 | A | 7/2011 |
| KR | 10-1335004 | B1 | 11/2013 |
| KR | 10-2014-0071236 | A | 6/2014 |
| KR | 10-1530500 | B1 | 6/2015 |
| KR | 10-1576813 | B1 | 12/2015 |
| KR | 10-2018-0095836 | A | 8/2018 |
| KR | 10-2019-0030766 | A | 3/2019 |
| KR | 10-1994107 | B1 | 9/2019 |
| KR | 10-2091485 | B1 | 3/2020 |
| KR | 10-2020-0038741 | A | 4/2020 |
| WO | 2018/061744 | A1 | 4/2018 |

OTHER PUBLICATIONS

Office Action issued on May 8, 2024 by the Korean Patent Office in corresponding Korean Patent Application No. 10-2020-0045979.
Communication issued Dec. 12, 2024 by the Korean Intellectual Property Office in Korean Patent Application No. 10-2020-0045979.

* cited by examiner

DISPLAY MODULE AND DRIVING METHOD OF DISPLAY MODULE

CROSS-REFERENCE TO RELATED APPLICATION

This application is a bypass continuation application of International Patent Application No. PCT/KR2021/004650, filed on Apr. 13, 2021, which claims priority from Korean Patent Application No. 10-2020-0045979, filed on Apr. 16, 2020 in the Korean Intellectual Property Office, the disclosures of which are incorporated herein by reference in their entireties.

BACKGROUND

1. Field

The disclosure relates to a display module and a method for driving a display module, and more particularly, relates to a display module in which a light emitting element constitutes a pixel and a method for driving a display module.

2. Description of the Related Art

In the related art, passive matrix (PM) driving was the mainstream for a display panel (e.g., LED display panel) in which an inorganic light emitting element such as a red light emitting diode (LED), a green (G) LED, or a blue (B) LED constitutes each subpixel.

However, the PM driving is not appropriate for realizing low power, because a light emitting duty ratio is low. Accordingly, in order to realize the low power of the LED display panel, active matrix (AM) driving using a pixel circuit configured with a transistor and/or a capacity is required.

Each subpixel in the LED display panel of the AM system includes an inorganic light emitting element and a pixel circuit for driving the inorganic light emitting element by a specific method (e.g., Pulse Amplitude Modulation (PAM) method and/or Pulse Width Modulation (PWM) method). In this case, a pixel circuit includes a driving transistor and there is a problem that a threshold voltage may vary for each driving transistor included in each pixel circuit.

Meanwhile, in the related art, in general, a gradation of subpixels is expressed through the Pulse Amplitude Modulation (PAM) driving method in the LED display panel of the AM system. However, in this case, not only gradation of light emitted, but also a wavelength changes depending on an amplitude of a driving current, which causes deterioration of color reproducibility of an image. FIG. 1 illustrates a change in wavelength according to a magnitude (or amplitude) of a driving current flowing through a blue LED, a green LED, and a red LED.

SUMMARY

One or more example embodiments provide a display module which provides enhanced color reproducibility for an input image signal through an inorganic light emitting element and a method for controlling a display module.

Further, one or more example embodiments provide a display module configured to include a pixel circuit capable of more efficiently and stably driving an inorganic light emitting element, and a method for controlling a display module.

According to an embodiment of the disclosure, there is provided a display module including a plurality of pixels, wherein each of the plurality of pixels includes a plurality of subpixels of different colors that are disposed in a matrix form, and wherein each of the plurality of subpixels includes: an inorganic light emitting element; a constant current generator which provides a constant current to the inorganic light emitting element; and a pulse width modulation (PWM) circuit which comprises a first depletion mode driving transistor, and is configured to control a time during which the constant current flows through the inorganic light emitting element based on a PWM data voltage applied to a gate terminal of the first depletion mode driving transistor and a threshold voltage of the first depletion mode driving transistor.

The threshold voltage of the first depletion mode driving transistor may be obtained while the first depletion mode driving transistor operates as a source follower.

The first depletion mode driving transistor may operate as the source follower while a direct current (DC) voltage is applied to a drain terminal of the first depletion mode driving transistor, and based on a reference voltage being applied to the gate terminal of the first depletion mode driving transistor while the first depletion mode driving transistor operates as the source follower, a voltage of a source terminal of the first depletion mode driving transistor may become a first voltage based on the reference voltage and the threshold voltage of the first depletion mode driving transistor.

The PWM circuit may include a first capacitor including a first terminal connected to the gate terminal of the first depletion mode driving transistor and a second terminal to which the first voltage is applied and then the PWM data voltage is applied, and, based on the PWM data voltage being applied to the second terminal of the first capacitor, the voltage of the gate terminal of the first depletion mode driving transistor may become a second voltage based on the PWM data voltage and the threshold voltage of the first depletion mode driving transistor from the reference voltage.

Based on the second voltage applied to the gate terminal of the first depletion mode driving transistor becoming the threshold voltage of the first depletion mode driving transistor by changing according to a sweep voltage which changes linearly and is applied through the second terminal of the first capacitor, the PWM circuit may control the constant current generator to stop the constant current which flows through the inorganic light emitting element.

The constant current generator may be a PAM circuit which includes a second depletion mode driving transistor and controls a magnitude of the constant current based on a pulse amplitude modulation (PAM) data voltage applied to a gate terminal of the second depletion mode driving transistor and a threshold voltage of the second depletion mode driving transistor.

The threshold voltage of the second depletion mode driving transistor may be obtained from a source terminal of the second depletion mode driving transistor while the second depletion mode driving transistor operates as a source follower.

The second depletion mode driving transistor may operate as the source follower while a DC voltage is applied to a drain terminal, and based on a reference voltage being applied to the gate terminal of the second depletion mode driving transistor while the second depletion mode driving transistor operates as the source follower, a voltage of the source terminal of the second depletion mode driving transistor may become a third voltage based on the reference voltage and the threshold voltage of the second depletion mode driving transistor.

The constant current generator may include a second capacitor including a first terminal connected to the gate terminal of the second depletion mode driving transistor and a second terminal to which the third voltage is applied and then the PAM data voltage is applied, and based on the PAM data voltage being applied to the second terminal of the second capacitor, the voltage of the gate terminal of the second depletion mode driving transistor may become a fourth voltage based on the PAM data voltage and the threshold voltage of the second depletion mode driving transistor from the reference voltage.

The fourth voltage may be maintained in the gate terminal of the second depletion mode driving transistor, until a gate terminal voltage of the first depletion mode driving transistor changes according to a sweep voltage which changes linearly and is applied to the PWM circuit and a voltage between a gate terminal and a source terminal of the first depletion mode driving transistor may become the threshold voltage of the first depletion mode driving transistor.

The constant current generator and the PWM circuit are formed in an oxide TFT layer on a substrate, and the inorganic light emitting element may be mounted on the TFT layer so as to be electrically connected to the constant current generator and the PWM circuit.

The PWM data voltage may be sequentially applied to the plurality of pixels disposed in the matrix form in a line unit, and the PAM data voltage may be applied to the plurality of pixels disposed in the matrix form at once.

The display module may be divided into a plurality of regions, and the constant current generator receives the PAM data voltage for each of the plurality of regions.

The display module may one of a plurality of display modules included in a display panel, and a PAM data voltage applied to a first display module among the plurality of display modules and a PAM data voltage applied to a second display module among the plurality of display modules may be different from each other.

The plurality of subpixels may include an R subpixel including a red (R) inorganic light emitting element, a G subpixel including a green (G) inorganic light emitting element, and a B subpixel including a blue (B) inorganic light emitting element.

According to another embodiment of the disclosure, there is provided a method for driving a display module including a plurality of pixels, wherein each of the plurality of pixels includes a plurality of subpixels of different colors that are disposed in a matrix form, each of the plurality of subpixels includes an inorganic light emitting element, a constant current generator which provides a constant current to the inorganic light emitting element, and a pulse width modulation (PWM) circuit which includes a depletion mode driving transistor, the driving method includes obtaining a threshold voltage of the depletion mode driving transistor, applying a PWM data voltage compensated based on the obtained threshold voltage to a gate terminal of the depletion mode driving transistor, and controlling a time during which the constant current flows through the inorganic light emitting element based on the compensated PWM data voltage.

As described above, according to various embodiments of the disclosure, the threshold voltage of the driving transistor included in the pixel circuit may be compensated efficiently and stably. In addition, a change of a wavelength of light emitted by the inorganic light emitting element included in the display module according to gradation may be prevented.

Accordingly, a stain or color of the inorganic light emitting element constituting the display module may be compensated, and even in a case of configuring a large-sized display panel by combining a plurality of display modules, a difference in luminance or color between the display modules may be compensated. In addition, more optimized design of the driving circuit may be realized and the inorganic light emitting element may be driven more stably and efficiently.

DETAILED DESCRIPTION

Figure 1:
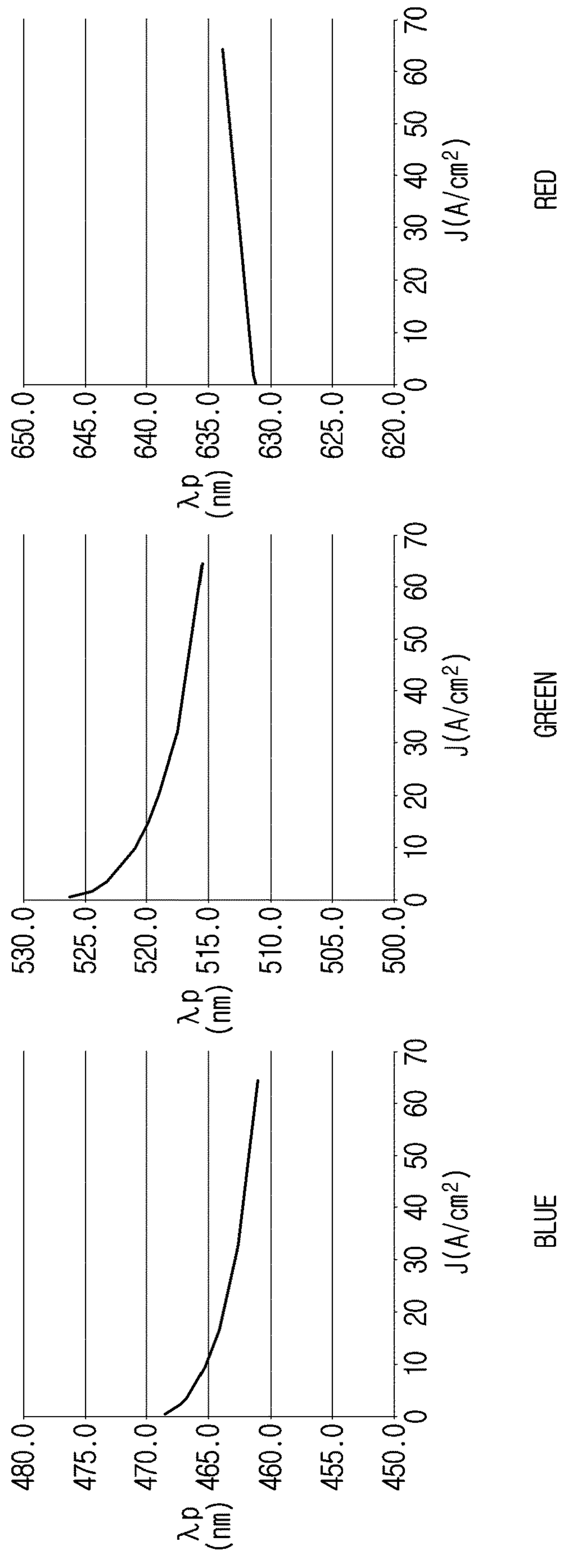
FIG. 1 is a graph illustrating a change in wavelength according to a magnitude of a driving current flowing through a blue LED, a green LED, and a red LED.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

A suffix "-er/or" of constituent elements used in the following description is applied or mixed by considering only ease of writing, and thus it does not have a meaning or role to be distinguished from each other.

The terms used in the disclosure are merely used to describe specific embodiments and may not be used to limit the disclosure. Unless otherwise defined specifically, a singular expression may encompass a plural expression.

It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

The expressions "first," "second" and the like used in the disclosure may denote various elements, regardless of order and/or importance, and may be used to distinguish one element from another, and does not limit the elements.

If it is described that a certain element (e.g., first element) is "operatively or communicatively coupled with/to" or is "connected to" another element (e.g., second element), it should be understood that the certain element may be connected to the other element directly or through still another element (e.g., third element).

On the other hand, if it is described that a certain element (e.g., first element) is "directly coupled to" or "directly connected to" another element (e.g., second element), it may be understood that there is no element (e.g., third element) between the certain element and another element.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

The terms used in the embodiments of the disclosure may be interpreted as meanings known to those skilled in the art, unless otherwise defined.

Hereinafter, various embodiments of the disclosure will be described in detail with reference to accompanying drawings.

Figure 2A:
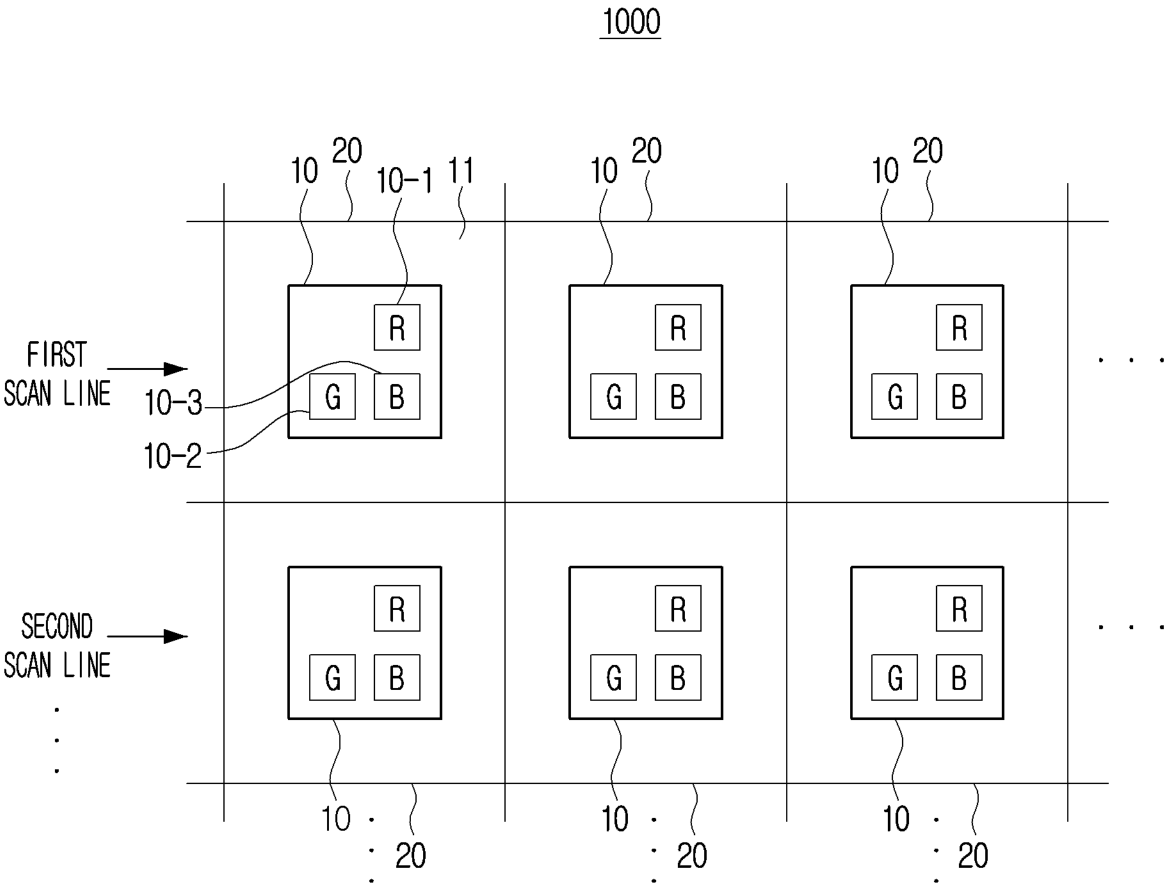
FIG. 2A is a diagram illustrating a pixel structure of a display module according to an embodiment.

FIG. 2A is a diagram illustrating a pixel structure of a display module according to an embodiment. Referring to FIG. 2A, a display module 1000 may include a plurality of pixels 10 disposed or arranged in a matrix form.

In this case, each pixel 10 may include a plurality of subpixels 10-1 to 10-3 having colors different from each other. For example, one pixel 10 included in the display module 1000 may include three kinds of subpixels such as a red (R) subpixel 10-1, a green (G) subpixel 10-2, and a blue (B) subpixel 10-3. In other words, one set of the R, G, and B subpixels may constitute one unit pixel of the display module 1000.

Meanwhile, referring to FIG. 2A, one pixel region 20 in the display module 1000 may include a region occupied by the pixel 10 and a remaining peripheral region 11.

The region occupied by the pixel 10 may include R, G, and B subpixels 10-1 to 10-3 as described above. In this case, each of the R, G, and B subpixels 10-1, 10-2, and 10-3 may include an inorganic light emitting element in a color corresponding to each subpixel, a constant current generator for providing a constant current with a constant amplitude by the inorganic light emitting element, and a Pulse Width Modulation (PWM) circuit for controlling time during which the constant current flows through the inorganic light emitting element.

Meanwhile, according to an embodiment of the disclosure, the remaining peripheral region 11 may include various circuits for driving subpixel circuits included in the display module 1000 and this will be described below in detail.

Figure 2B:
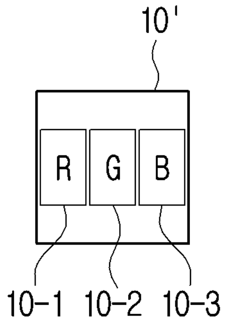
FIG. 2B is a diagram illustrating a structure of subpixels in one pixel according to another embodiment.

FIG. 2B is a diagram illustrating a structure of subpixels in one pixel according to another embodiment. Referring to FIG. 2A, the subpixels 10-1 to 10-3 are arranged in one pixel 10 in a shape of horizontally-flipped L.

However, the embodiment is not limited thereto, and the R, G, and B subpixels 10-1 to 10-3 may be arranged in a line in a pixel 10', as illustrated in FIG. 2B. Such an arrangement of the subpixels is merely an example, and a plurality of subpixels may be arranged in various forms in each pixel according to an embodiment.

Meanwhile, in the example described above, it is described that the pixel is configured with three kinds of subpixels, but there is no limitation thereto. For example, the pixel may be implemented with four kinds of subpixels of R, G, B, and W (white), and any number of subpixels may constitute one pixel according to an embodiment. Hereinafter, for convenience of description, a case of the pixel 10 configured with three types of subpixels of R, G, and B will be described as an example.

Figure 3:
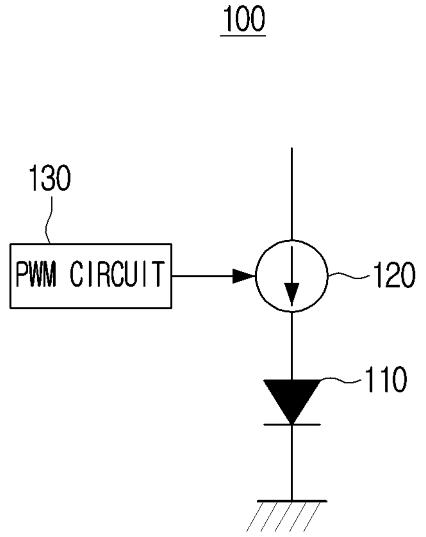
FIG. 3 is a configuration diagram of a subpixel according to an embodiment.

FIG. 3 is a configuration diagram of a subpixel 100 included in the display module 1000 according to an embodiment. Referring to FIG. 3, the subpixel includes an inorganic light emitting element 110, a constant current generator 120, and a PWM circuit 130. In this case, the constant current generator 120 and the PWM circuit 130 constitute a pixel circuit for driving the inorganic light emitting element 110.

The inorganic light emitting element 120 may emit light with different luminance in accordance with an amplitude or a pulse width of a driving current provided from the constant current generator 120. The pulse width of the driving current herein is time during which the driving current provided by the constant current generator 120 flows through the inorganic light emitting element 110, and may be expressed as a duty ratio of the driving current or duration of the driving current.

For example, the inorganic light emitting element 110 may emit light with higher luminance as the amplitude of the driving current is great, and may emit light with higher luminance as the pulse width is long (that is, as the duty ratio is high or the duration is long), but there is no limitation thereto.

The inorganic light emitting element 110 may constitute subpixels 10-1 to 10-3 of the display module 1000 and a plurality of types thereof may be provided in accordance with colors of light emitted. For example, the inorganic light emitting element 110 may be provided as a red (R) inorganic light emitting element configured to emit red light, a green (G) inorganic light emitting element configured to emit green light, and a blue (B) inorganic light emitting element configured to emit blue light.

The kind of subpixel included in the display module 1000 may be determined in accordance with the color of the inorganic light emitting element 110. In other words, an R inorganic light emitting element may constitute the R subpixel 10-1, a G inorganic light emitting element may constitute the g subpixel 10-2, and a B inorganic light emitting element may constitute the B subpixel 10-3.

Herein, the inorganic light emitting element 110 is a light emitting element manufactured by using an inorganic material which is different from an organic light emitting diode (OLED) manufactured by using an organic material. Hereinafter, the LED refers to the inorganic light emitting element distinguished from the OLED.

Meanwhile, according to an embodiment of the disclosure, the inorganic light emitting element 110 may be a micro light emitting diode (LED) (μ-LED). The micro LED is a micro-inorganic light emitting element having a size of 100 micrometers (μm) or less which emits light by itself.

The constant current generator 120 provides a constant current to the inorganic light emitting element 110. The constant current refers to a current having a constant amplitude. The inorganic light emitting element 110 emits light while the constant current flows through the inorganic light emitting element 110. Accordingly, the constant current flowing through the inorganic light emitting element 110 is a driving current for driving the inorganic light emitting element 110.

According to an embodiment of the disclosure, the constant current generator 120 may be implemented as a PAM circuit. The PAM circuit may drive the inorganic light emitting element 110 by a PAM driving method. The PAM driving method is a driving method for expressing gradation by controlling an amplitude of a driving current flowing through the inorganic light emitting element 110. For this, the PAM circuit may provide to the inorganic light emitting element 110, a driving current having an amplitude corresponding to a PAM data voltage. Accordingly, the constant current generator 120 may be implemented using the PAM circuit by applying the PAM data voltage having a certain magnitude to the PAM circuit.

Hereinafter, for convenience of description, it is described using a case where the constant current generator 120 is implemented as the PAM circuit as an example. However, the embodiment is not limited thereto, and any one may be the constant current generator 120 according to various embodiments of the disclosure, as long as it may provide a constant current to the inorganic light emitting element 110.

The PWM circuit 130 may drive the inorganic light emitting element 110 by the PWM driving method. The PWM driving method is a driving method for expression gradation based on time during which the inorganic light emitting element 110 emits light. Since the inorganic light emitting element 110 emits light only during the time when the constant current flows through the inorganic light emitting element 110, the PWM circuit 130 may perform the PWM driving of the inorganic light emitting element 110 by controlling a pulse width of the driving current.

Specifically, the PWM circuit 130 may control the pulse width of the driving current by controlling duration time during which constant current provided by the constant current generator 120 flows through the inorganic light emitting element 110. For example, the PWM circuit 130 may control the constant current generator 120 so that the constant current flows through the inorganic light emitting element 110 only during the time corresponding to the applied PWM data voltage.

Figure 4:
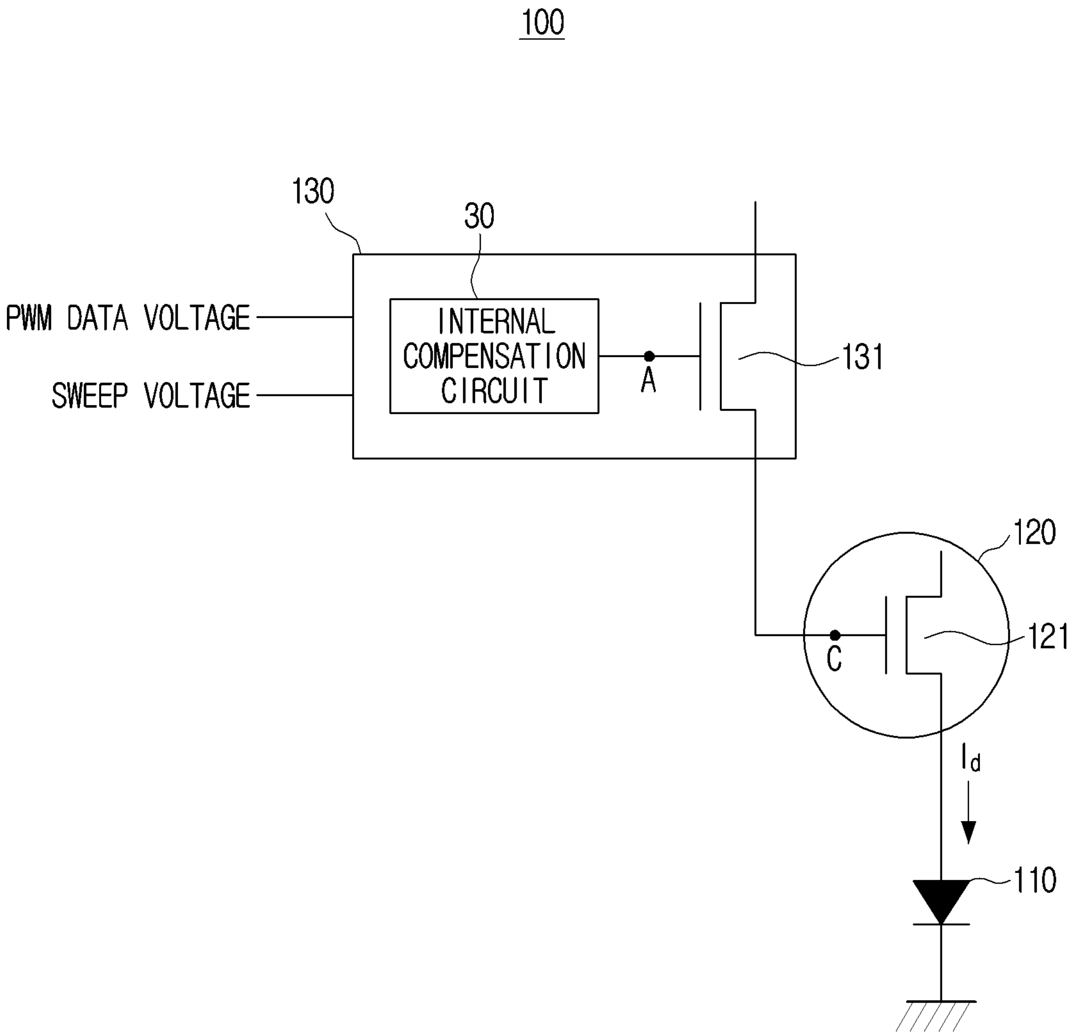
FIG. 4 is a configuration diagram of the subpixel according to an embodiment.

FIG. 4 is a configuration diagram more specifically illustrating the subpixel 100 of FIG. 3. Referring to FIG. 4, the constant current generator 120 may include a driving transistor 121, and provide a driving current Id to the inorganic light emitting element 110 through the driving transistor 121 that is turned on.

The PWM circuit 130 may include a driving transistor 131 and an internal compensation circuit 30 for compensating a threshold voltage of the driving transistor 131, and control a pulse width of the driving current Id provided to the inorganic light emitting element 110 by the constant current generator 120.

Specifically, when a time corresponding to the PWM data voltage elapses, after the constant current generator 120 starts to provide the driving current Id to the inorganic light emitting element 110, the driving transistor 131 of the PWM circuit 130 is turned on. Accordingly, the driving transistor 121 of the constant current generator 120 is turned off and the driving current Id does not flow through the inorganic light emitting element 110 anymore. As described above, the pulse width of the driving current Id may be controlled.

In this case, a problem regarding the threshold voltage of the driving transistor 131 may occur. Specifically, a plurality of subpixels exist in the display module 1000 and the corresponding driving transistor 131 exists in each subpixel.

Theoretically, the transistors manufactured in the same condition should have the same threshold voltage, but for the actual transistors, a difference may occur in threshold voltage, although they are manufactured in the same condition, and the same applies to the driving transistors 131 included in the display module 1000.

As described above, in a case where the threshold voltages of the driving transistors 131 included in the display module 1000 are different from each other, although the same PWM data voltage is applied to the PWM circuit 130 of each subpixel, a driving current having different pulse widths by the difference in threshold voltage is provided to each inorganic light emitting element 110, and this causes a deterioration in color reproducibility of the display module 1000.

Accordingly, a threshold voltage of the driving transistors 131 included in the display module 1000 is required to be compensated.

The internal compensation circuit 30 is a constituent element for compensating the threshold voltage of the driving transistor 131. Specifically, the PWM circuit 130 may obtain a threshold voltage of the driving transistor 131 through the operation of the internal compensation circuit 30, and when a PWM data voltage is applied thereafter, the PWM circuit may compensate for the threshold voltage of the driving transistor 131 by applying a voltage based on the threshold voltage of the transistor 131 and the PWM data voltage to a gate terminal A of the driving transistor 131.

Accordingly, the PWM circuit 130 may enable the driving current Id having a pulse width corresponding to the magnitude of the applied PWM data voltage to the inorganic light emitting element 110, regardless of the threshold voltage of the driving transistor 131.

In this case, a term "internal compensation" indicates that the threshold voltage of the driving transistor 131 is autonomously compensated within the PWM circuit 130 during the operation of the PWM circuit 130, and such an internal compensation method is distinguished from an external compensation method for compensating the threshold voltage of the driving transistor 131 by compensating the PWM data voltage on the outside of the PWM circuit 130.

Meanwhile, the operation of the PWM circuit 130 illustrated in FIG. 4 will be described in more detail. According to an embodiment of the disclosure, the driving transistor 131 of the PWM circuit 130 illustrated in FIG. 4 is an N-type depletion mode transistor.

The depletion mode transistor is a transistor in which a channel is formed in advance between a drain and a source through doping treatment during a manufacturing step. The N-type depletion mode transistor is a negative threshold voltage, and is turned off only when a negative voltage of the threshold voltage or more is applied between a gate terminal and a source terminal. A P-type depletion mode transistor has a positive threshold voltage, and is turned off only when a positive voltage of the threshold voltage or more is applied between a gate terminal and a source terminal.

Referring to FIG. 4, in a state where the voltage based on the threshold voltage of the driving transistor 131 and the PWM data voltage is applied to the gate terminal A of the driving transistor 131, when the constant current generator 120 provides the driving current Id having a constant amplitude to the inorganic light emitting element 110, the inorganic light emitting element 110 stars light emitting.

In this case, for the PWM data voltage, a negative voltage lower than the threshold voltage of the driving transistor 131 is used. For example, for the PWM data voltage, a voltage between −15 [V] to −20 [V] may be used, but there is no limitation thereto.

Accordingly, in a state where the voltage based on the threshold voltage of the driving transistor 131 and the PWM data voltage is applied to the gate terminal A of the driving transistor 131, the driving transistor 131 is in the off state.

Meanwhile, when the constant current generator 120 starts to provide the driving current Id to the inorganic light emitting element 110, a sweep voltage which changes linearly is applied to the PWM circuit 130. The driving transistor 131 in the off state maintains its off state until the voltage of the gate terminal A linearly increases according to the sweep voltage to reach the threshold voltage of the driving transistor 131.

Then, when the voltage of the gate terminal A of the driving transistor 131 reaches the threshold voltage of the driving transistor 131, the driving transistor 131 is turned on and a low voltage is applied to a gate terminal C of the driving transistor 121 of the constant current generator 120 through the driving transistor 131.

In this case, in a case where the driving transistor 121 of the constant current generator 120 may be designed to be turned off when the low voltage is applied to the gate terminal C. Accordingly, when the low voltage is applied to the gate terminal of the driving transistor 121, the driving transistor 121 is turned off, the driving current Id does not flow through the inorganic light emitting element 110 anymore, and the inorganic light emitting element 110 stops the light emitting.

As described above, the PWM circuit 130 may control the pulse width of the driving current by controlling the voltage of the gate terminal C of the driving transistor 121 of the constant current generator 120. In this case, since the threshold voltage of the driving transistor 131 is compensated, the pulse width of the driving current Id subordinate only to the PWM data voltage may be controlled, regardless of the threshold voltage of the driving transistor 131.

Figure 5A:
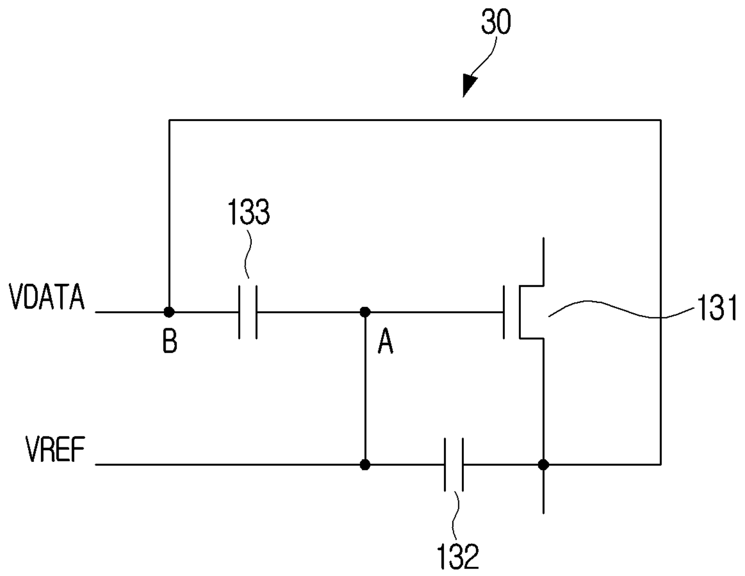
FIG. 5A is a diagram illustrating an operation of an internal compensation circuit.
Figure 5B:
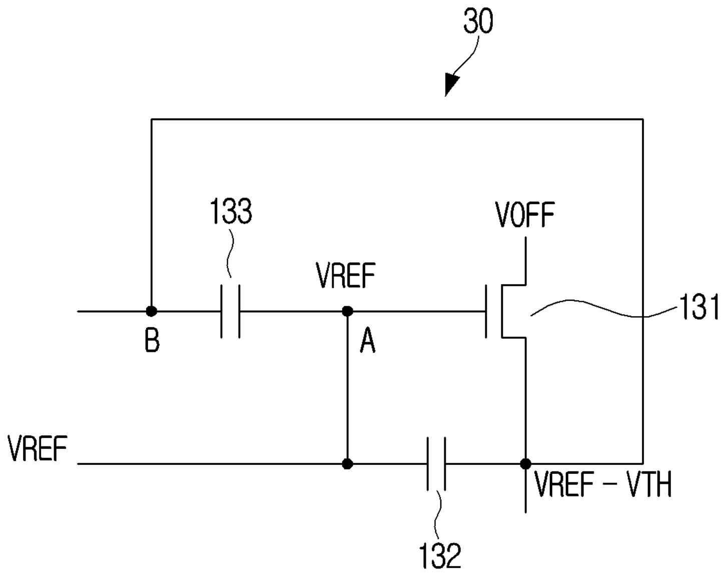
FIG. 5B is a diagram illustrating the operation of the internal compensation circuit.
Figure 5C:
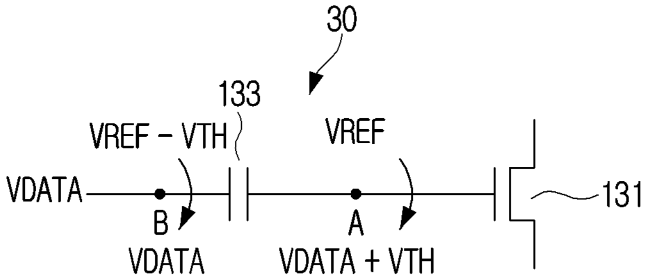
FIG. 5C is a diagram illustrating the operation of the internal compensation circuit.

Hereinafter, the operation of the internal compensation circuit will be described in more detail with reference to FIGS. 5A to 5C. In FIGS. 5A to 5C, the driving transistor 131 is the N-type depletion mode transistor and the internal compensation circuit 30 may include the two capacitors 132 and 133 connected to the driving transistor 131.

As will be described below, according to an embodiment of the disclosure, the PWM circuit 130 may be driven in an initialization section, a threshold voltage extraction section, and a PWM data setting section in this order. FIGS. 5A to 5C schematically illustrate a connection state of the internal compensation circuit 30 in each of the initialization section, the threshold voltage extraction section, and the PWM data setting section to the extent that it is necessary to describe the operation.

Referring to FIG. 5A, one terminal of the capacitor 132 is connected to a source terminal of the driving transistor 131 (in the depletion transistor, a source terminal and a drain terminal may be exchanged according to a voltage applied to the terminal, and thus the source terminal of the driving transistor 131 may be the drain terminal during a subsequent operation), the other terminal thereof is connected to the gate terminal A of the driving transistor 131, and a reference signal VREF is input through the other terminal. Meanwhile, one terminal of a capacitor 133 is connected to the gate terminal A of the driving transistor 131 and a data signal Vdata is applied to the other terminal B.

The initialization section is a section in which main nodes (e.g., node A and node B) in the PWM circuit 130 are initialized to an initial voltage (e.g., −10 [V]). Accordingly, in the initialization section, the initial voltage is applied through a reference signal VREF and a data signal Vdata, and therefore both the node A and the node B are initialized to the initial voltage.

The threshold voltage extraction section is a section for obtaining or extracting the threshold voltage of the driving transistor 131. In the threshold voltage extraction section, the internal compensation circuit 30 is in a connection state as in FIG. 5B, a reference voltage (e.g., 0 [V]) is applied to the gate terminal A of the driving transistor 131 through the reference signal VREF.

In this case, a high voltage which is a DC voltage is applied to the drain terminal of the driving transistor 131 through a VOFF signal and accordingly, the driving transistor 131 operates as a source follower.

The source follower is referred to as a common drain amplifier, since the DC voltage is applied to the drain terminal, the gate terminal is used for input and the source terminal is used for output. Meanwhile, the source follower has DC characteristics that a voltage corresponding to a difference between the input voltage and the threshold voltage of the source follower is output from the source terminal, when the input voltage is applied to the gate terminal, and thus the source follower is also referred to as a level shifter.

Accordingly, referring to FIG. 5B, when the reference voltage VREF is applied to the gate terminal A while the driving transistor 131 operates as the source follower, a voltage VREF-Vth corresponding to a difference between a reference voltage VREF and a threshold voltage Vth of the driving transistor 131 is output from the source terminal of the driving transistor 131.

Meanwhile, in the threshold voltage extraction section, the source terminal of the driving transistor 131 is connected to the other terminal (that is, node B) of the capacitor 133, as a result, as illustrated in FIG. 5B, the reference voltage VREF is applied to the node A and the VREF−Vth corresponding to the difference between the reference voltage VREF and the threshold voltage Vth of the driving transistor 131 is applied to the node B.

Meanwhile, the data voltage setting section is a section in which the PWM data voltage is set to the gate terminal of the driving transistor 131. In the data setting section, the internal compensation circuit 30 is in a connection state as in FIG. 5C, the PWM data voltage (e.g., voltage between −15 [V] to −20 [V]) applied to the other terminal B through the data signal Vdata is coupled through the capacitor 133 and applied to the gate terminal A of the driving transistor 131.

Specifically, as illustrated in FIG. 5C, as the data signal Vdata having the PWM data voltage is applied to the other terminal B of the capacitor 133, the voltage of the node B becomes Vdata from VREF−Vth, and the voltage of the node A becomes Vdata+Vth from VREF.

As described above, through the operation of the internal compensation circuit 30, as the voltage (that is, Vdata+Vth) based on the PWM data voltage and the threshold voltage Vth of the driving transistor 131, not simply the PWM data voltage, is set to the gate terminal A of the driving transistor 131, the threshold voltage Vth of the driving transistor 131 may be compensated.

Figure 6:
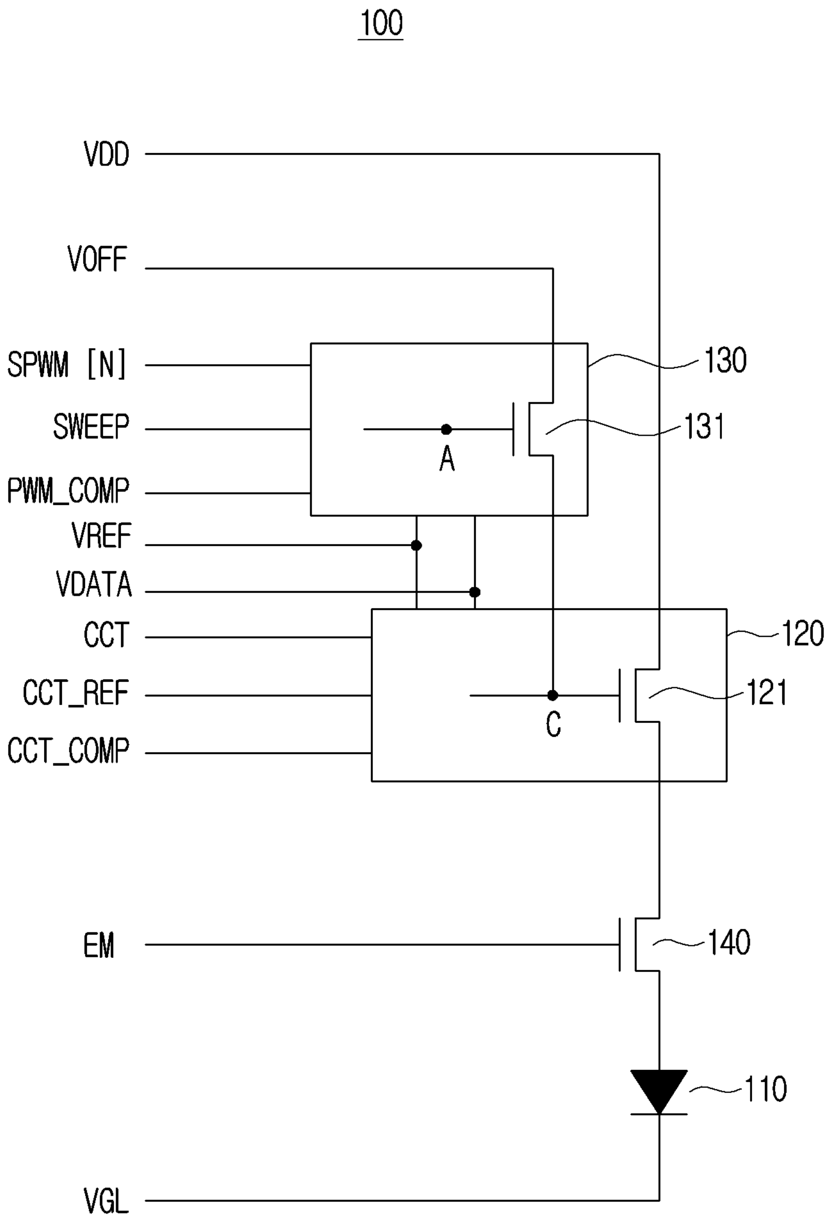
FIG. 6 is a configuration diagram of the subpixel according to an embodiment.

FIG. 6 is a configuration diagram of the subpixel 100 according to an embodiment. Referring to FIG. 6, the subpixel 100 includes the inorganic light emitting element 110, the constant current generator 120, and the PWM circuit 130. In the embodiment of FIG. 6, the constant current generator 120 may be implemented as a PAM circuit.

When the constant current generator 120 is implemented as the PAM circuit, the constant current generator 120 provides the driving current Id having an amplitude corresponding to the PAM data applied form the outside to the inorganic light emitting element 110.

In this case, when the threshold voltages of the driving transistors 121 included in the display module 1000 are different from each other, even when the same PAM data voltage is applied to the constant current generator 120 of each subpixel, the driving currents having different amplitudes by the difference of the threshold voltages are provided to each inorganic light emitting element 110, and this may be a reason for a deterioration in color reproducibility of the display module 1000.

Accordingly, the threshold voltage of the driving transistor 121 of the constant current generator 120 included in the display module 1000 is also required to be compensated as the threshold voltage of the driving transistor 131 of the PWM circuit 130 described above.

For this, although not illustrated in the drawings, an internal compensation circuit operates as illustrated in FIGS. 5A to 5C may be included in each of the PWM circuit 130 and the constant current generator 120. Accordingly, in a case of the subpixel 100 of FIG. 6, the threshold voltage of the driving transistor 131 of the PWM circuit 130 and the threshold voltage of the driving transistor 121 of the constant current generator 120 may be compensated, respectively during the operation process.

Meanwhile, in the example of FIG. 6, the PAM circuit plays a role of the constant current generator 120 and the threshold voltage of the driving transistor 121 is compensated inside during the operation process. Accordingly, according to an embodiment of the disclosure, the PAM data voltage may be applied to all pixels (or all subpixels) included in the display module 1000 at once. In this case, the PAM data voltage applied to each pixel (or each subpixel) may be a voltage having the same magnitude, but the embodiment is not limited thereto.

Accordingly, in the entire time section for displaying one image frame, a light emitting section for emitting light by the inorganic light emitting element 110 may be sufficiently secured.

This is a distinction from the external compensation method in which the PAM data voltage having the compensated threshold voltage should be applied individually for each line by scanning the pixels included in the display module 1000 for each line in sequence.

In addition, in the example of FIG. 6, the gradation of an image may be expressed by the PWM driving method through the PWM circuit 130. Accordingly, according to an embodiment of the disclosure, the PWM data voltage may be applied to the pixels included in the display module 1000 in a line unit in sequence in order to express the gradation for each pixel.

As described above, in the display module 1000, a subpixel is configured in a unit of the inorganic light emitting element 110 and each subpixel includes the PWM circuit 130. Accordingly, unlike a liquid crystal display (LCD) module using a plurality of LEDs which emit light with the same single color as a backlight, the display module 1000 according to an embodiment of the disclosure may express different gradations in the unit of subpixels by applying the PWM data voltages having different magnitudes to the PWM circuit 130 included in each subpixel.

Various signals and a transistor 140 illustrated in FIG. 6 will be described in detail with reference to FIGS. 8 to 9F, and therefore the description herein is omitted.

Figure 7:
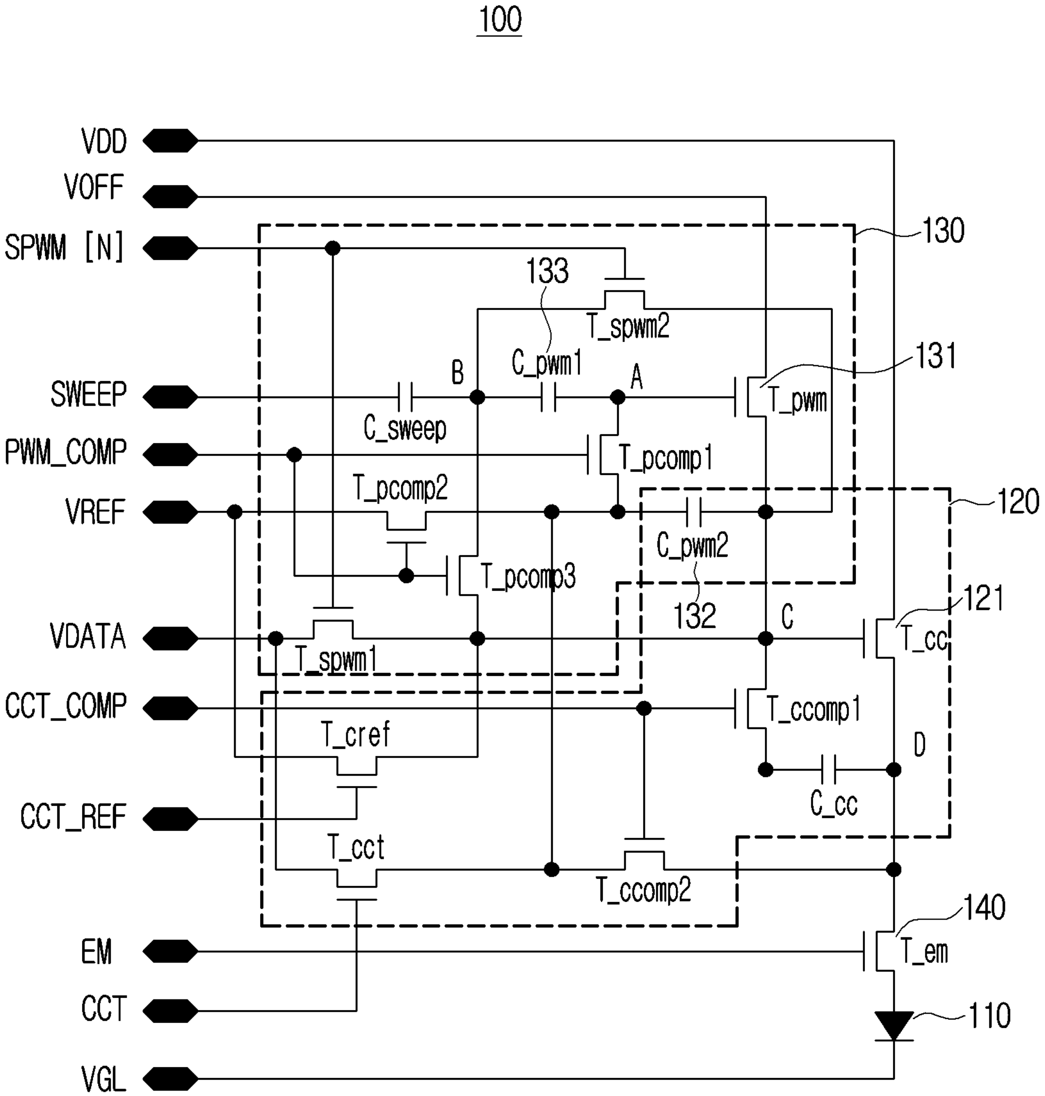
FIG. 7 is a specific circuit diagram of the subpixel illustrated in FIG. 6.

FIG. 7 illustrates an example of a specific circuit of the subpixel 100 illustrated in FIG. 6. In the display module 1000, a circuit shown in FIG. 7 may be provided for each subpixel. Meanwhile, the inorganic light emitting element 110 of FIG. 7 may be an LED of any one color of R, G, and B.

The subpixel 100 includes the inorganic light emitting element 110, a plurality of transistors T_pwm, T_spwm1, T_spwm2, T_pcomp1, T_pcomp2, T_pcomp3, T_cc, Tccomp1, Tccomp2, T_cref, T_cct, and T_em, and a plurality of capacitors C_pwm1, C_pwm2, C_sweep, and C_cc, and these constituent elements may have a connection relationship as illustrated in FIG. 7.

In this case, T_pwm, T_spwm1, T_spwm2, T_pcomp1, T_pcomp2, T_pcomp3, C_pwm1, C_pwm2, and C_sweep mainly relate to the operation of the PWM circuit 130, and T_cc, Tccomp1, Tccomp2, T_cref, T_cct, C_cc, C_pwm2 mainly relate to the operation of the constant current generator 120.

In relation to this, the subpixel 100 organically operates as each of the plurality of transistors illustrated in FIG. 7 is turned on or off by various signals VDD, VOFF, SPWM[n], Sweep, PWM_COMP, VREF, Vdata, CCT_COMP, CCT_REF, EM, CCT, and VGL applied to the subpixel 100.

Accordingly, the PWM circuit 130 mainly related to the PWM operation and the constant current generator 120 mainly related to the PAM operation may be separated as illustrated in FIG. 7, the on/off state of the transistors included in the constant current generator 120 affects the operation of the PWM circuit 130, and the on/off state of the transistors included in the PWM circuit 130 affects the operation of the constant current generator 120.

Meanwhile, in FIG. 7, the transistor T_pwm corresponds to the driving transistor 131 of the PWM circuit 130 described above, the capacitor C_pwm2 corresponds to the capacitor 132 of the internal compensation circuit 30 described above, and the capacitor C_pmw1 corresponds to the capacitor 133 of the internal compensation circuit 30 described above.

The transistor T_cc corresponds to the driving transistor 121 of the constant current generator 120 described above.

As will be described below, the transistor T_em 140 is turned on and the driving current provided by the constant current generator 120 is provided to the inorganic light emitting element 110.

All the transistors illustrated in FIG. 7 may be N-type depletion mode transistors, but the embodiment is not limited thereto.

The roles of various signal wires VDD, VOFF, SPWM[n], Sweep, PWM_COMP, VREF, Vdata, CCT_COMP, CCT_REF, EM, CCT, VGL illustrated in FIG. 7 are described below briefly.

The VDD provides the driving voltage (e.g., +5 [V]) to the driving transistor 121 of the constant current generator 120 and controls on/off of the inorganic light emitting element 110.

VOFF provides a DC voltage (e.g., +5 [V]) to the driving transistor 131 of the PWM circuit 130 so that the driving transistor 131 operates as the source follower, and provides a low voltage (e.g., −15 [V]) to the driving transistor 121 of the constant current generator 120 through the turned-on driving transistor 131 to turn off the driving transistor 121.

SPWM[n] provides a scan signal for selecting pixels (e.g., PWM circuits 130) included in the display module 1000 in unit of scan line (or gate line) in sequence to the display module 1000. Herein, n represents a number of lines.

For example, in a case where the display module 1000 is configured with 270 scan lines (or gate lines), 270 scan signals from SPWM[1] to SPWM[270] are applied to the corresponding scan line (or gate line) in sequence.

While the PWM circuit 130 is selected, the threshold voltage of the driving transistor 131 of the selected PWM circuit 130 may be compensated and the PWM data voltage is set to the gate terminal A of the driving transistor 131 of the selected PWM circuit 130.

SWEEP provides a sweep signal voltage which changes linearly to the gate terminal A of the driving transistor 131. Accordingly, the on/off of the driving transistor 131 is controlled.

VREF provides a reference voltage for extracting the threshold voltage of the driving transistors 131 and 121.

PWM_COMP extracts the threshold voltage of the driving transistor 131 by applying the reference voltage to the gate terminal A of the driving transistor 131 of the PWM circuit 130.

CCT_REF and CCT_COMP extract and compensate for the threshold voltage of the driving transistor 121 by applying the reference voltage to the gate terminal C of the driving transistor 121 of the constant current generator 120.

Vdata provides the PWM data voltage and the PAM data voltage for gradation expression.

EM controls the on/off of the inorganic light emitting element 110.

CCT sets and maintains the PAM data voltage to the gate terminal C of the driving transistor 121 of the constant current generator 120.

VGL provides a ground voltage (e.g., −5 [V]).

Hereinafter, the operation of the circuit illustrated in FIG. 7 will be described in detail with reference to FIGS. 8 to 9F.

Figure 8:
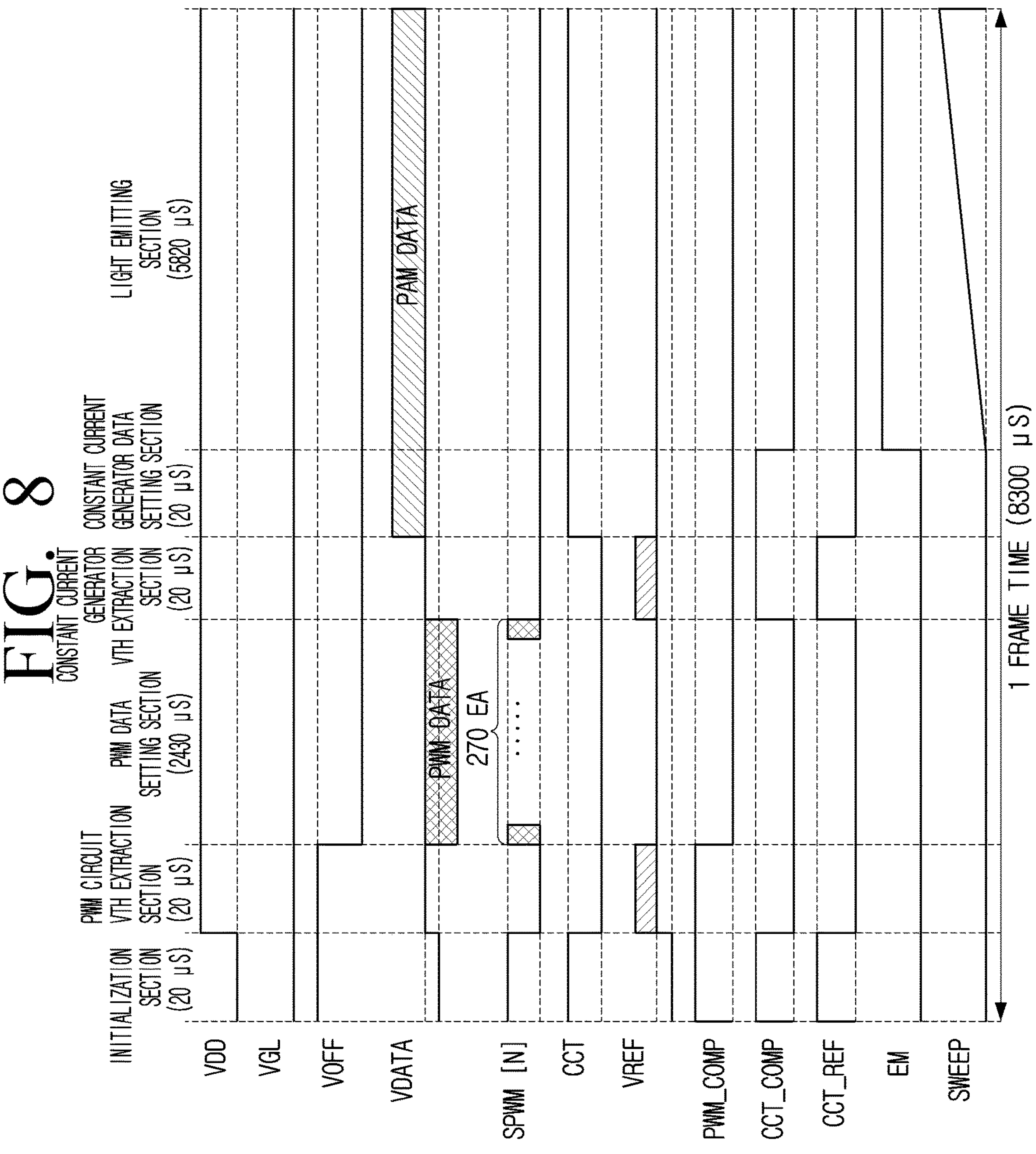
FIG. 8 is a timing diagram of various signals for driving a subpixel circuit illustrated in FIG. 7.

FIG. 8 is a timing diagram of various signals for driving a subpixel circuit illustrated in FIG. 7. As illustrated in FIG. 8, the subpixel 100 included in the display module 1000 may be driven in the initialization section, the threshold voltage extraction section of the PWM circuit 130, the PWM data setting section, the threshold voltage extraction section of the constant current generator 120, the data setting section of the constant current generator 120, and the light emitting section in this order.

Figure 9A:
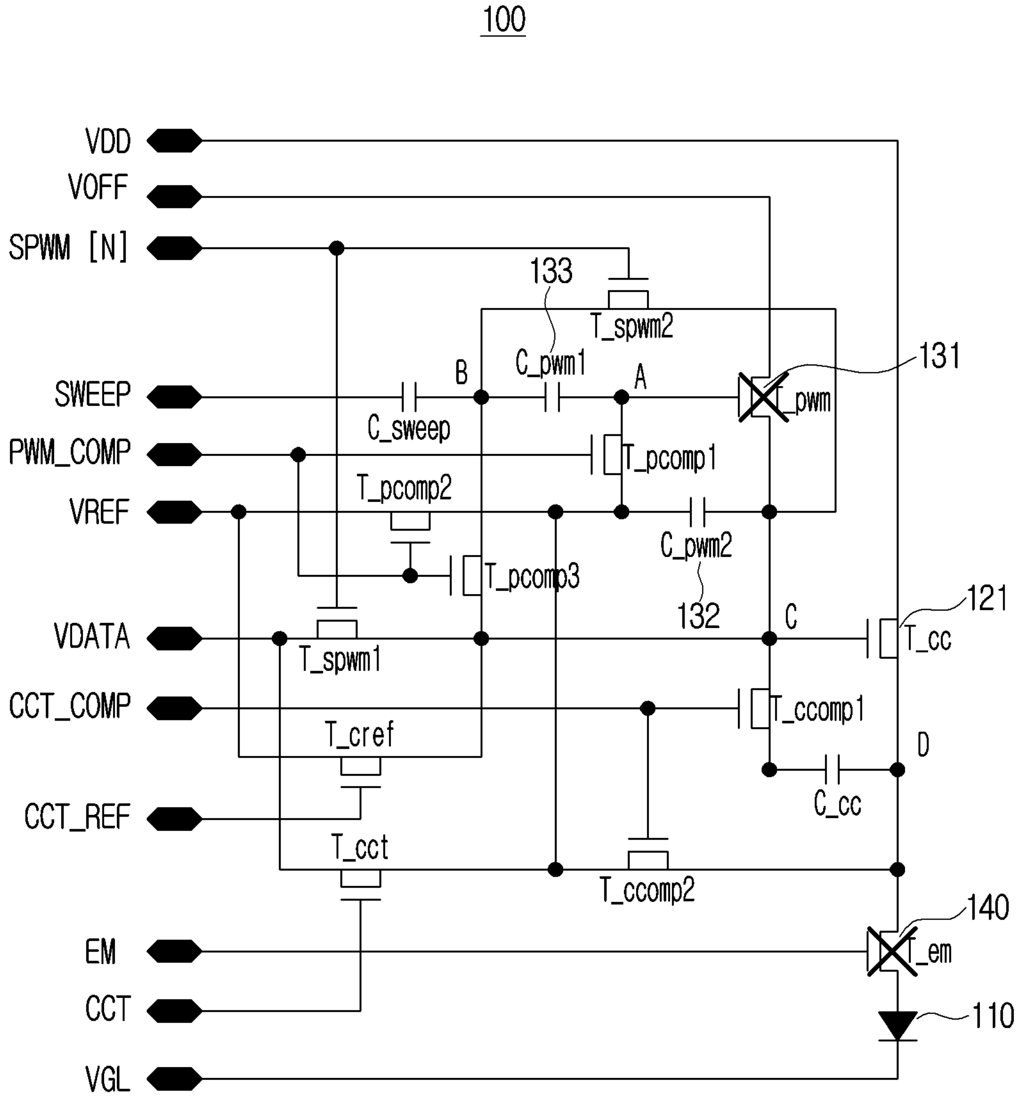
FIG. 9A is a diagram illustrating a specific operation of the subpixel circuit illustrated in FIG. 7.
Figure 9B:
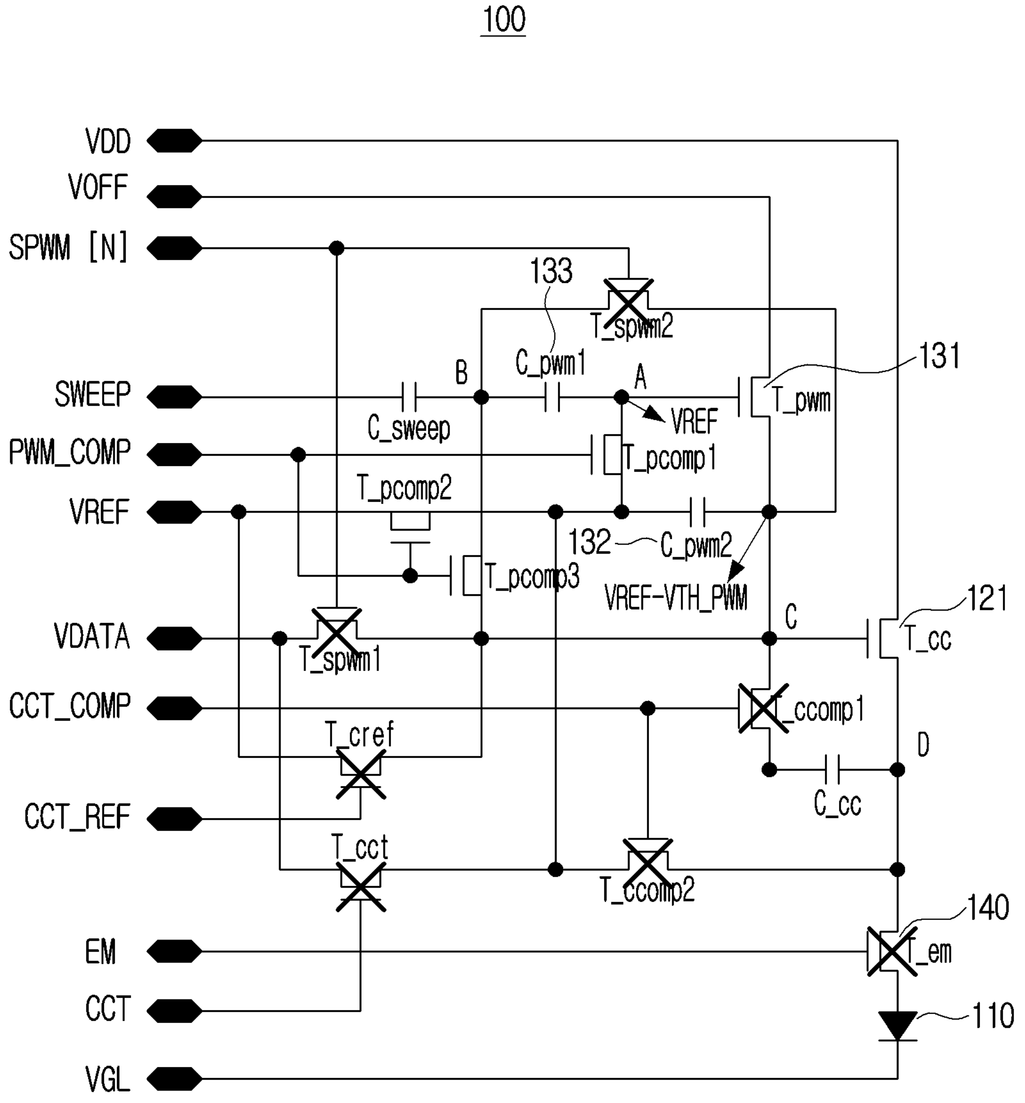
FIG. 9B is a diagram illustrating a specific operation of the subpixel circuit illustrated in FIG. 7.
Figure 9C:
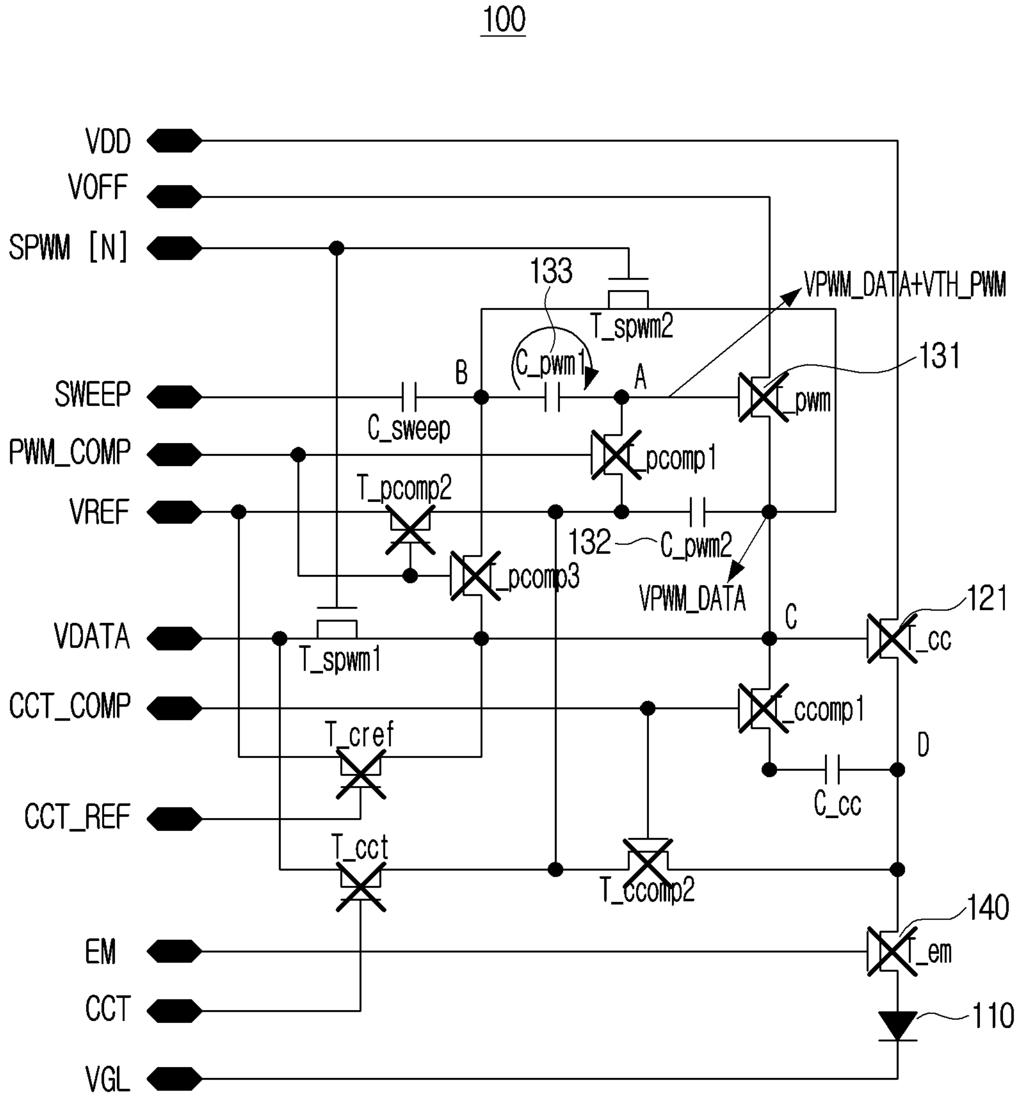
FIG. 9C is a diagram illustrating a specific operation of the subpixel circuit illustrated in FIG. 7.
Figure 9D:
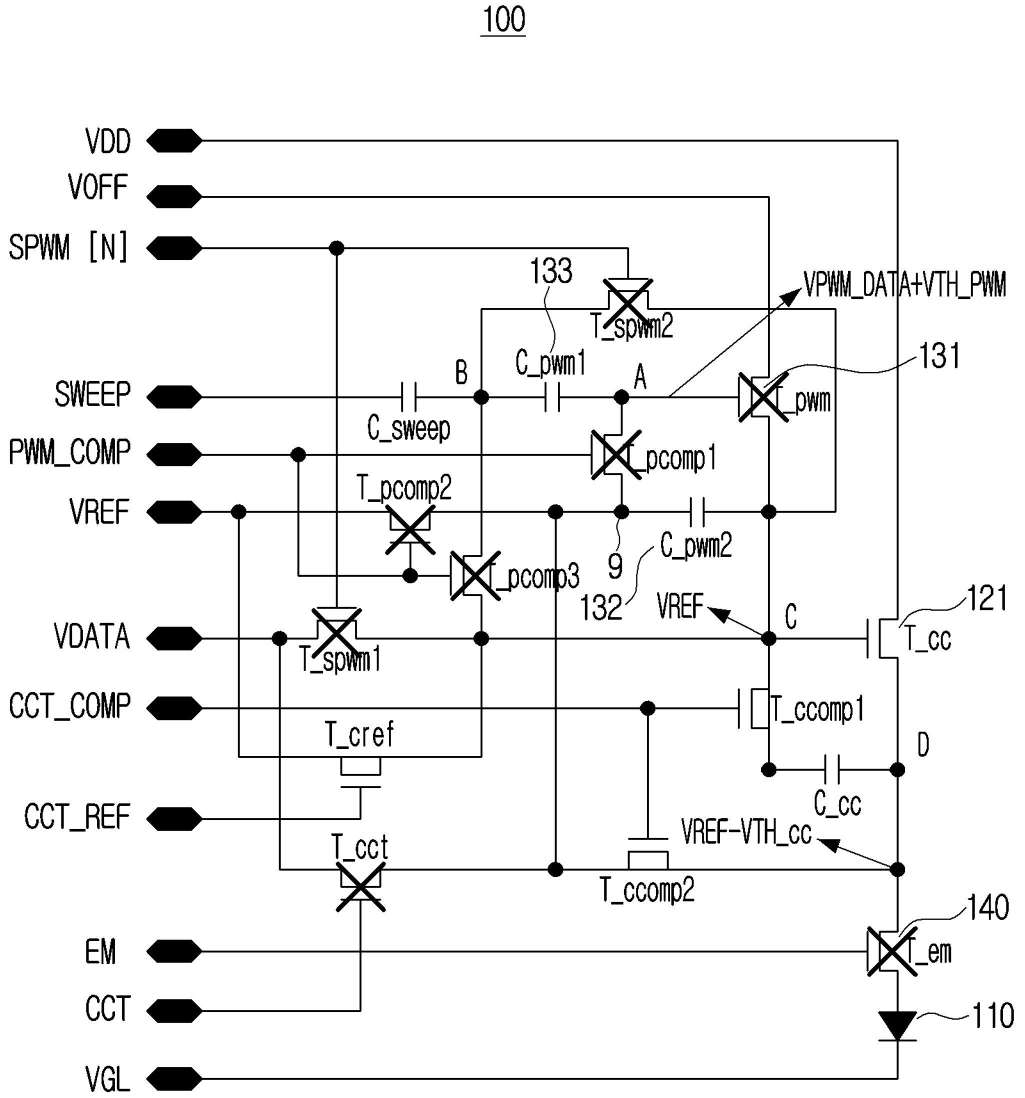
FIG. 9D is a diagram illustrating a specific operation of the subpixel circuit illustrated in FIG. 7.
Figure 9E:
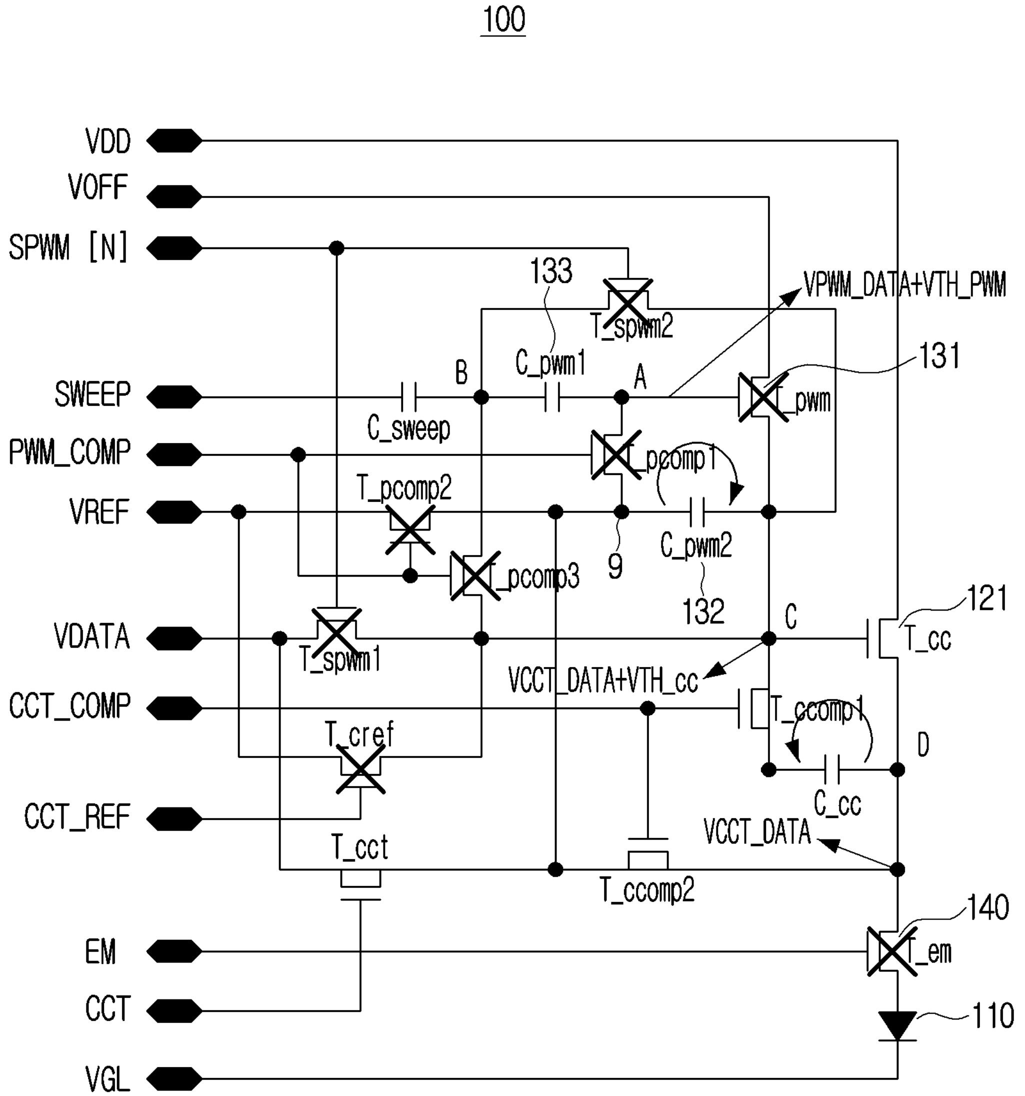
FIG. 9E is a diagram illustrating a specific operation of the subpixel circuit illustrated in FIG. 7.
Figure 9F:
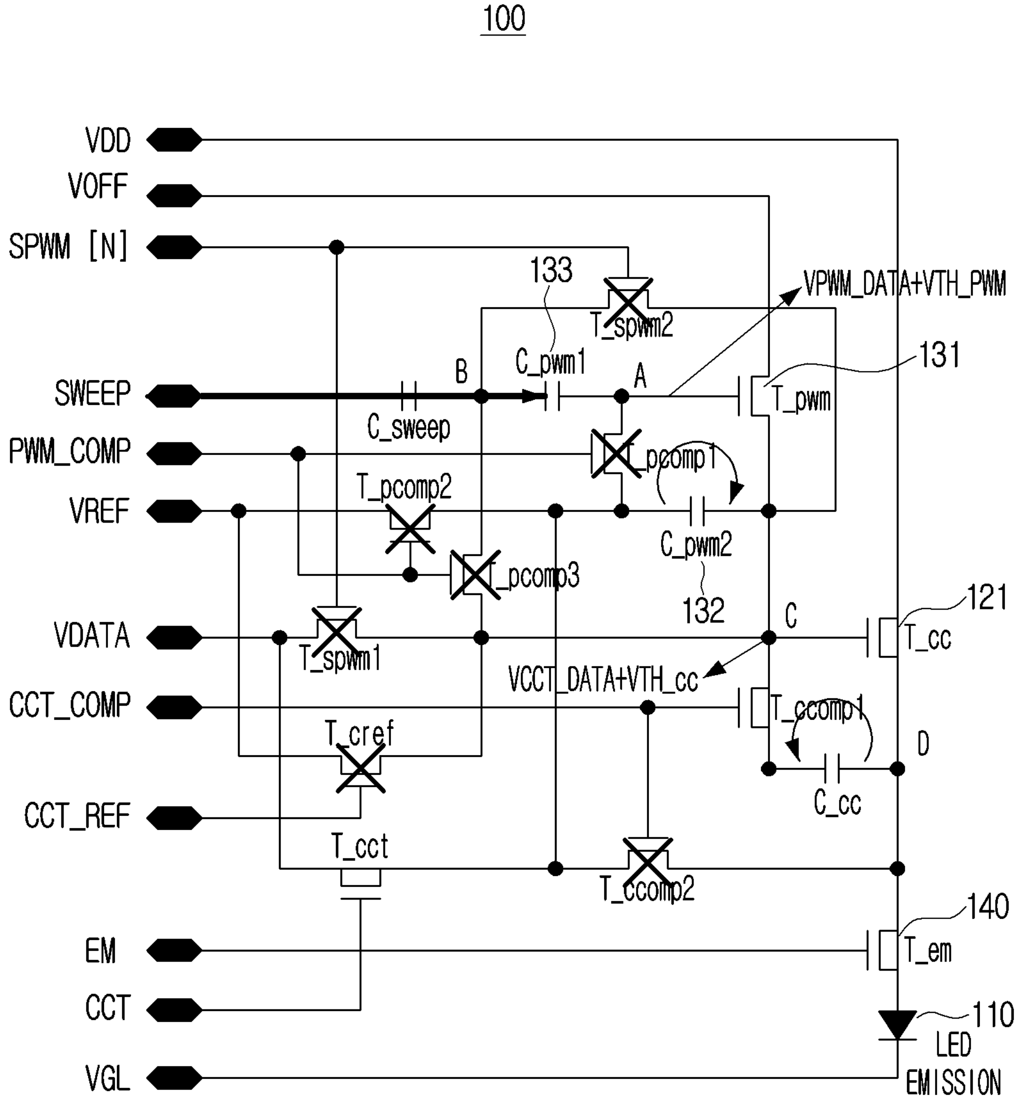
FIG. 9F is a diagram illustrating a specific operation of the subpixel circuit illustrated in FIG. 7.

FIG. 9A illustrates the operation of the subpixel 100 in the initialization section, FIG. 9B illustrates the operation of the subpixel 100 in the threshold voltage extraction section of the PWM circuit 130, FIG. 9C illustrates the operation of the subpixel 100 in the PWM data setting section, FIG. 9D illustrates the operation of the subpixel 100 in the threshold voltage extraction section of the constant current generator 120, FIG. 9E illustrates the operation of the subpixel 100 in the data setting section of the constant current generator 120, and FIG. 9F illustrates the operation of the subpixel 100 in the light emitting section.

The initialization section is a section in which voltages of main nodes (e.g., node A, node B, node C, and node D) in the subpixel 110 are initialized to the initial voltage (e.g., −10 [V]) in order to prevent erroneous operation of the driving transistors 131 and 121. The initialization section is driven for each image frame.

Referring to FIG. 8, in the initialization section, each of the signals SPWM[n], CCT, PWM_Comp, CCT_Comp, and CCT_Ref maintains a high voltage (e.g., +5 [V]) and a low voltage (e.g., −5 [V]) is applied to VREF and Vdata. Accordingly, in the initialization section, as illustrated in FIG. 9A, the voltage of all nodes A, B, C, and D is initialized to the low voltage.

The threshold voltage extraction section of the PWM circuit 130 is a driving section for extracting a threshold voltage Vth_pwm of the driving transistor 131 of the PWM circuit 130.

Referring to FIG. 8, in the threshold voltage extraction section of the PWM circuit 130, the signal PWM_Comp maintains the high voltage (e.g., +5 [v]). Accordingly, as illustrated in FIG. 9B, a voltage (reference voltage (e.g., 0 [v])) applied to the signal wire VREF is transferred to the gate terminal (that is, node A) of the driving transistor (T_pwm) 131.

In addition, referring to FIG. 8, it is illustrated that, in the threshold voltage extraction section of the PWM circuit 130, the high voltage (e.g., +5 [V]) is applied to the signal wire VOFF. Since the signal wire VOFF is connected to the drain terminal of the driving transistor (T_pwm) 131, the driving transistor (T_pwm) 131 in which the high voltage which is the DC voltage is applied to the drain terminal operates as the source follower.

Accordingly, in the threshold voltage extraction section of the PWM circuit 130, referring to FIG. 9B, a voltage (that is, VREF−Vth_pwm) corresponding to a difference between the reference voltage VREF and the threshold voltage Vth_pwm of the driving transistor (T_pwm) 131 is output from the source terminal (that is, node C) of the driving transistor (T_pwm) 131.

Meanwhile, in the threshold voltage extraction section of the PWM circuit 130, the signal PWM_Comp maintains the high voltage (e.g., +5 [V]), as illustrated in FIG. 9B, the transistor T_pcomp3 is turned on and the node C and the node B are connected to each other. Accordingly, as a result, the voltage VREF is applied to the node A and the voltage VREF-Vth_pwm is applied to the node B and the node C, both terminals of the capacitor (C_pwm1) 133 and both terminals of the capacitor (C_pmw2) 132 store the threshold voltage Vth_pwm of the driving transistor (T_pwm) 131, respectively.

As described above, the threshold voltage Vth_pwm of the driving transistor (T_pwm) 131 may be extracted in the threshold voltage extraction section of the PWM circuit 130.

Meanwhile, the PWM data setting section is a section in which the PWM data voltage is set to the gate terminal to the PWM circuit 130 (specifically, gate terminal (that is, node A) of the driving transistor (T_pwm) 131 in order to express the gradation of the inorganic light emitting element 110.

As illustrated in FIG. 8, in the PWM data setting section, the high voltage (e.g., +5 [V]) is applied in sequence in the unit of each scan line (or gate line) through the signal wire SPWM[n].

For example, when the display module 1000 includes 270 scan lines (or gate lines), the high voltage may be applied to the PWM circuits 130 included in each scan line (or gate line) in sequence through 270 signal wires SPWM[n] from SPWM[1] to SPWM[270]. Accordingly, the PWM data voltage is applied to the PWM circuit 130 included in each san line (or gate line) in sequence through the signal wire Vdata.

Referring to FIG. 9C, in the PWM data setting section, the transistor T_spwm1 and the transistor T_spwm2 are turned on according to the signal SPWM[n], and accordingly, the PWM data voltage Vpwm_data is applied to the node C and the node B through the signal wire Vdata.

Accordingly, the voltage of the node B is changed from VREF−Vth_pwm to Vpwm_data, and the voltage for the amount of Vpwm_data−VREF+Vth_pwm is transferred to the node A through the capacitor (C_pwm1) 133. Accordingly, the voltage of the node A is Vpwm_data+Vth_pwm.

As described above, in the PWM data setting section, the voltage (that is, Vpwm_data+Vth_pwm) based on the PWM data voltage Vpwm_data and the threshold voltage Vth_pwm of the diving transistor (T_pwm) 131 is set to the gate terminal (that is, node A) of the driving transistor (T_pwm) 131.

The threshold voltage extraction section of the constant current generator 120 is a driving section for extracting the threshold voltage Vth_cc of the driving transistor 121 of the constant current generator 120.

Referring to FIG. 8, in the threshold voltage extraction section of the constant current generator 120, the signal CCT_Ref has a high voltage (e.g., +5 [V]). Accordingly, referring to FIG. 9D, the voltage (reference voltage (e.g., 0 [V])) applied to the signal wire VREF is transferred to the gate terminal (that is, node C) of the driving transistor (T_cc) 121.

In addition, referring to FIG. 8, it is illustrated that, in the threshold voltage extraction section of the constant current generator 120, the high voltage (e.g., +5 [V]) is applied to the signal wire VDD. Since the signal wire VDD is connected to the drain terminal of the driving transistor (T_cc) 121, the driving transistor (T_cc) 121 in which the high voltage which is the DC voltage is applied to the drain terminal operates as the source follower.

Accordingly, in the threshold voltage extraction section of the constant current generator 120, as illustrated in FIG. 9D, the voltage (that is, VREF−Vth_cc) corresponding to the difference between the reference voltage VREF and the threshold voltage Vth_cc of the driving transistor (T_cc) 121 is output from the source terminal (that is, node D) of the driving transistor (T_cc) 121.

Meanwhile, in the threshold voltage extraction section of the constant current generator 120, since the signal CCT_Comp has a high voltage (e.g., +5 [V]), as illustrated in FIG. 9D, the transistor T_ccomp2 and the transistor T_ccomp1 are turned on, and accordingly, the voltage VREF is applied to the node C and the voltage VREF−Vth_cc is applied to the node D and one terminal 9 of the capacitor C_pwm2. That is, both terminals of the capacitor C_pmw2 and both terminals of the C_cc store the threshold voltage Vth_cc of the driving transistor (T_cc) 121, respectively.

As described above, in the threshold voltage extraction section of the constant current generator 120, the threshold voltage Vth_cc of the driving transistor (T_cc) 121 may be extracted.

The data setting section of the constant current generator 120 is a section in which the data voltage is set to the constant current generator 120. As described above, in a case where the constant current generator 120 is implemented as the PAM circuit, the constant current generator 120 provides a driving current having an amplitude corresponding to the PAM data voltage to the inorganic light emitting element 110. Accordingly, it is necessary to set the PAM data voltage to the gate terminal of the driving transistor (T_cc) 121 of the constant current generator 120.

As illustrated in FIG. 8, in the data setting section of the constant current generator 120, the high voltage (e.g., +5 [V]) is applied to the signal CCT and the signal CCT_comp, and at that time, the PAM data voltage for determining the amplitude of the driving current is applied to the constant current generator 120 through the signal wire Vdata.

Referring to FIG. 9E, in the data setting section of the constant current generator 120, the transistor T_cct is turned on according to the signal CCT, and the transistor T_ccomp2 is turned on according to the signal CCT_comp. Accordingly, the PAM data voltage Vcct_data is applied to the one terminal 9 and the node D of the capacitor C_pwm2 through the signal wire Vdata.

The voltage of the one terminal 9 and the voltage of the node D of the capacitor C_pwm2 are changed from VREF−Vth_cc to Vcct_data, respectively.

Meanwhile, in the data setting section of the constant current generator 120, since the transistor T_ccomp1 is also turned on according to the signal CCT_comp, the capacitor C_pwm2 and the capacitor C_cc have a parallel structure based on the node C. Accordingly, the voltage for the amount of Vcct_data−VREF+Vth_cc may be stably transferred to the node C through the capacitor C_pwm2 and the capacitor C_cc.

The voltage of the node C, to which the voltage for the amount of Vcct_data−VREF+Vth_cc is transferred, is Vcct_data+Vth_cc.

As described above, in the data setting section of the constant current generator 120, the voltage (that is, Vcct_data+Vth_cc) based on the PAM data voltage Vcct_data and the threshold voltage Vth_cc of the diving transistor (T_cc) 121 is set to the gate terminal (that is, node C) of the driving transistor (T_cc) 121.

Meanwhile, as illustrated in FIG. 8, it is illustrated that the signal CCT is applied to all scan lines (or gate lines) included in the display module 1000 at once, unlike the signal SPWM[n]. Accordingly, according to an embodiment of the disclosure, the PAM data voltage may be applied and set to all constant current generators 120 included in the display module 1000 at once, unlike the PWM data voltage.

As described above, the reason for setting the PAM data voltage at once is because that, according to various embodiments of the disclosure, the gradation of the image is expressed through the PWM driving method, and all the threshold voltage Vth_pwm of the driving transistor T_pwm of the PWM circuit 130 and the threshold voltage Vth_cc of the driving transistor T_cc of the constant current generator 120 are compensated by the internal compensation method.

For example, in a case where an image is displayed at 120 hertz (Hz), approximately 8,300 microseconds (μs) is needed to display one image frame, and when the display module is configured with 270 scan lines (or gate lines), time of approximately 2,430 us is required to scan all lines.

In a case of using the external compensation method, the scanning of all lines is necessary in the PAM data setting, and accordingly, approximately 5,000 us is needed to set the PWM data voltage and the PAM data voltage to all pixels of the display module 1000. Accordingly, a time length that the light emitting section is able to occupy per image frame is difficult to exceed 40% such as (3300/8300)*100=39.8%.

However, as described above, according to an embodiment of the disclosure, the PAM data voltage may be set to all constant current generator 120 of the display module 1000 at once. Referring to the time allocated to each section illustrated in FIG. 8, when a percentage of time that the light emitting section is able to occupy per image frame is calculated, it is illustrated that 65% or more may be secured such as 5820/8300)*100=70.1%.

If the light emitting section is short, a light emitting control time per gradation decreases, and accordingly, it is difficult to express various gradations through the PWM driving method, but according to an embodiment of the disclosure, the light emitting section may be secured sufficiently, thereby extending the life of the inorganic light emitting element 110.

In addition, various resources (e.g., functions related to a TCON, a memory, a data driver, a PCB, and the like) necessary for performing the external compensation of the threshold voltages Vth_pwm and Vth_cc of the driving transistors 131 and 121 of the related art are no longer needed, and this may cause simplification of the operation and cost reduction.

The light emitting section is a section in which the inorganic light emitting element 110 emits light during time corresponding to the PWM data voltage.

As illustrated in FIG. 8, in the light emitting section, since the EM signal changes to the high voltage (e.g., +5 [V]), the transistor T_em is turned on as illustrated in FIG. 9F.

Accordingly, at both terminals of the inorganic light emitting element 110, a potential difference corresponding to a difference between the high voltage (or driving voltage, e.g., +5 [V]) according to the signal VDD and the low voltage (or ground voltage, e.g., −5 [V]) according to the signal VGL occurs, the driving current having an amplitude corresponding to the PAM data voltage Vcct_data flows through the inorganic light emitting element 110, and the inorganic light emitting element 110 starts light emitting.

At that time, referring to FIG. 8, it is illustrated that, in the light emitting section, the signal Vdata maintains the PAM data voltage Vcct_data. Accordingly, in the light emitting section, the voltage (that is, Vcct_data+Vth_cc) set to the gate terminal of the driving transistor T_cc of the constant current generator 120 is maintained by the capacitor (C_pwm2) 132 and the signal Vdata.

At that time, the voltage (that is, Vcct_data+Vth_cc) set to the gate terminal (that is, node C) of the driving transistor T_cc is maintained at the node C only until the driving transistor T_pwm is turned on, as will be described below, and the inorganic light emitting element 110 emits light only during which the voltage Vcct_data+Vth_cc is maintained at the node C.

Specifically, referring to FIGS. 8 and 9F, it is illustrated that, as the light emitting section starts, the sweep voltage Vsweep which is a voltage linearly changes through the signal wire SWEEP is applied to the PWM circuit 130.

In this case, the sweep voltage Vsweep is applied to the node A through the capacitor C_sweep and the capacitor (C_pwm1) 131 and the voltage of the node A changes according to a change in sweep voltage Vsweep. When the voltage of the node A increases and the difference between the voltage of the node A and the source terminal of the driving transistor T_pwm increases to be larger than the threshold voltage Vth_pwm of the driving transistor T_pwm, the driving transistor T_pwm is turned on, accordingly, the voltage Vcct_data+Vth_cc stored in the node C is discharged through the signal wire VOFF, and accordingly, the light emitting of the inorganic light emitting element 100 stops.

Meanwhile, as described above, in the depletion mode transistor, the source terminal and the drain terminal may change according to the voltage applied to the terminal. Specifically, in the initialization section or the threshold voltage extraction section of the PWM circuit 130 in which the high voltage (e.g., +5 [V]) is applied through the signal wire VOFF, the terminal of the driving transistor T_pwm connected to the signal wire VOFF becomes the drain terminal. However, in the light emitting section in which the low voltage (e.g., −15 [V]) is applied through the signal wire VOFF, as described above, the terminal of the driving transistor T_pwm connected to the signal wire VOFF becomes the source terminal.

As described above, in the light emitting section, the inorganic light emitting element 110 emits light during the time corresponding to the PWM data voltage Vpwm_data.

Various exemplary voltages described above and the driving time of each section illustrated in FIG. 8 are merely examples and the embodiment is not limited to the numerical values described.

In addition, hereinafter, it is described that the driving transistor is the N-type depletion mode transistor, for example, but the embodiment is not limited thereto, and various embodiments of the disclosure may be applied to the P-type depletion mode transistor.

Figure 10A:
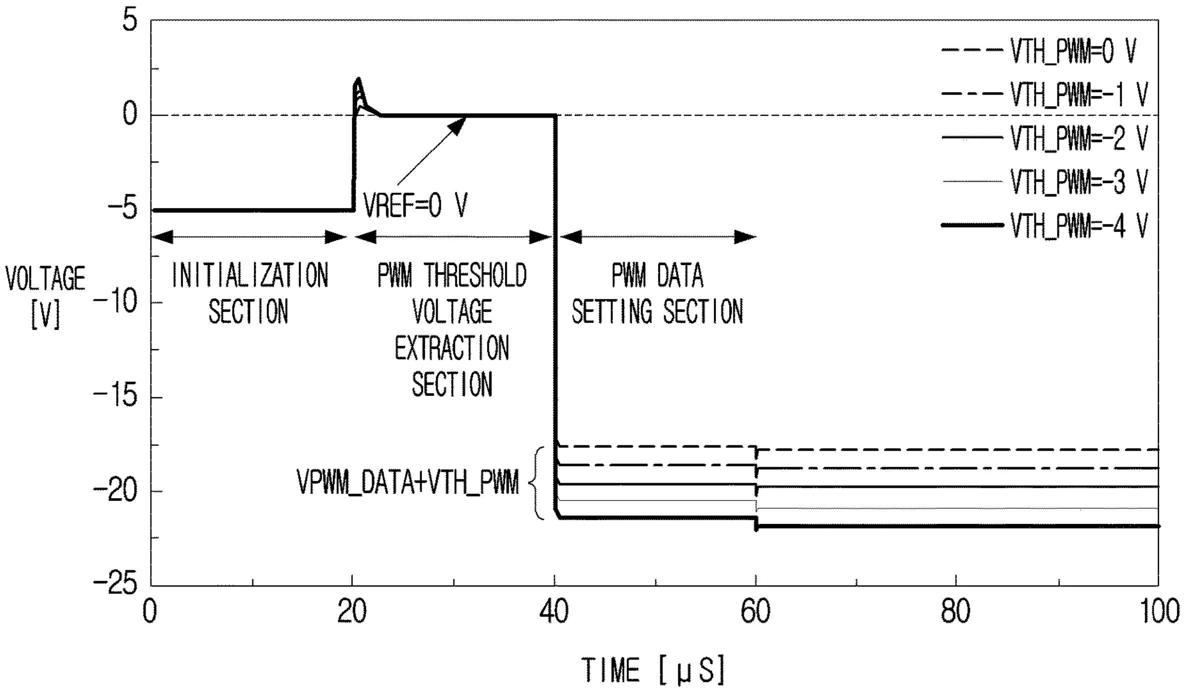
FIG. 10A is a simulation wavelength according to a change in threshold voltage of a driving transistor included in a PWM circuit according to an embodiment.
Figure 10B:
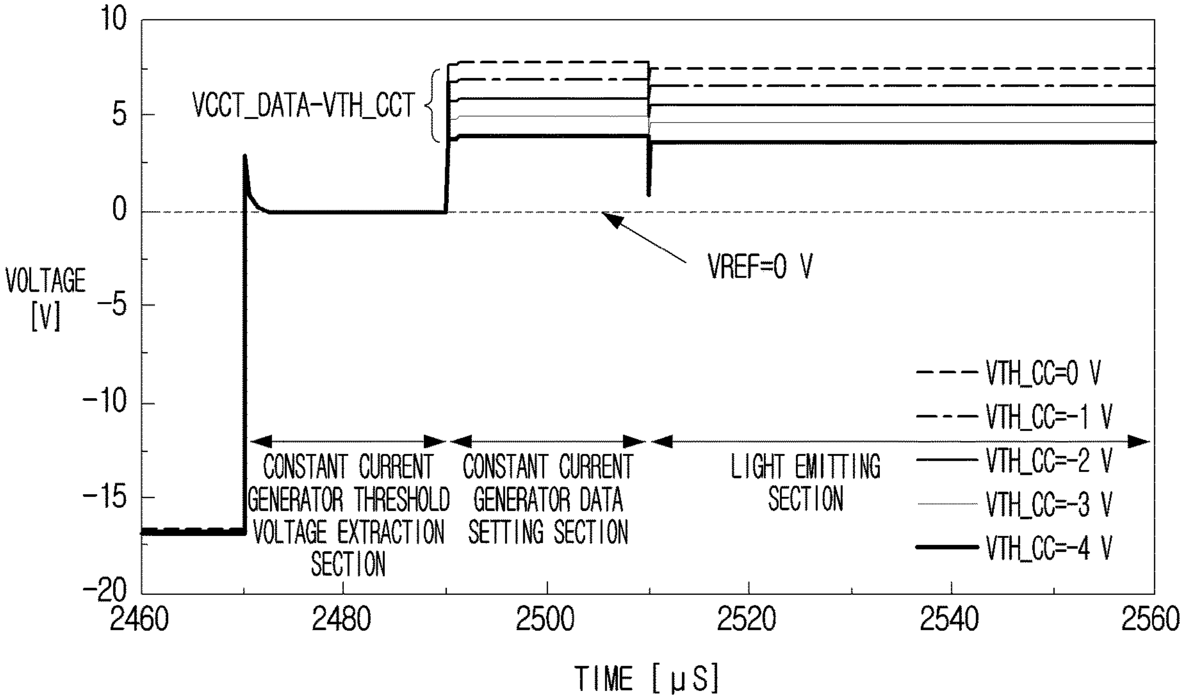
FIG. 10B is a simulation wavelength according to a change in threshold voltage of a driving transistor included in a constant current generator according to an embodiment.
Figure 11:
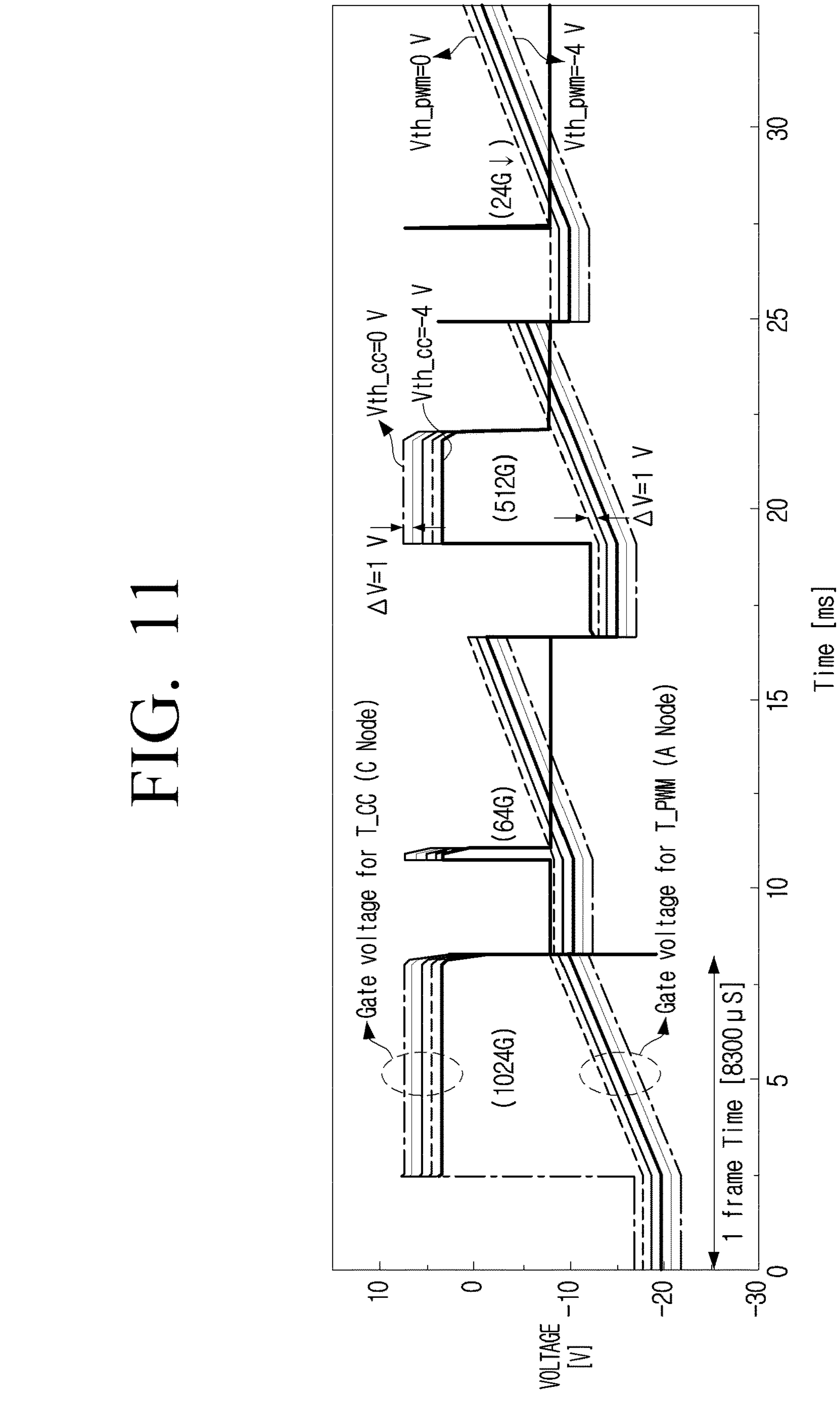
FIG. 11 is a graph illustrating gate voltages of driving transistors according to various gradations.

FIGS. 10A to 11 illustrate simulation wavelengths according to the threshold voltage of the driving transistors included in the PWM circuit and the constant current generator of the display module according to an embodiment of the disclosure.

In this case, the transistors included in the PWM circuit 130 and the constant current generator 120 may be an IGZO TFT based on a depletion mode oxide thin film transistor, but is not limited thereto.

Specifically, FIG. 10A illustrates a simulation wavelength used to check whether it is able to compensate for the threshold voltage, when the threshold voltage Vth_pwm of the driving transistor T_pwm of the PWM circuit 130 is changed from 0 [V] to −4 [V] at interval of 1 [V], and FIG. 10B illustrates a simulation wavelength used to check whether it is able to compensate for the threshold voltage, when the threshold voltage Vth_cc of the driving transistor T_cc of the constant current generator 120 is changed from 0 [V] to −4 [V] at interval of 1 [V].

As described above, it is illustrated that, for both the PWM circuit 130 and the constant current generator 120, the threshold voltage of the driving transistor is extracted and compensated smoothly.

Meanwhile, FIG. 11 is a graph illustrating gate voltages of driving transistors according to various gradations.

As shown with the voltage of the gate terminal (node A) of the driving transistor T_pwm and the voltage of the gate terminal (node C) of the driving transistor T_cc illustrated in FIG. 11, it is illustrated that, although the threshold voltage is changed from 0 [V] to −4 [V] at interval of 1 [V], for both the PWM circuit 130 and the constant current generator 120, the threshold voltage is compensated and operated smoothly without a significant error, for expressing various gradations such as 1024 gradations, 64 gradations, 512 gradations, and 24 gradations.

In addition, as shown with the voltage of the node C illustrated in FIG. 11, in each gradation, it is illustrated that the light emitting time of the inorganic light emitting element 110 (that is, turn-on time of the driving transistor T_cc) is also constant without a significant difference, regardless of the change of the threshold voltage.

Figure 12:
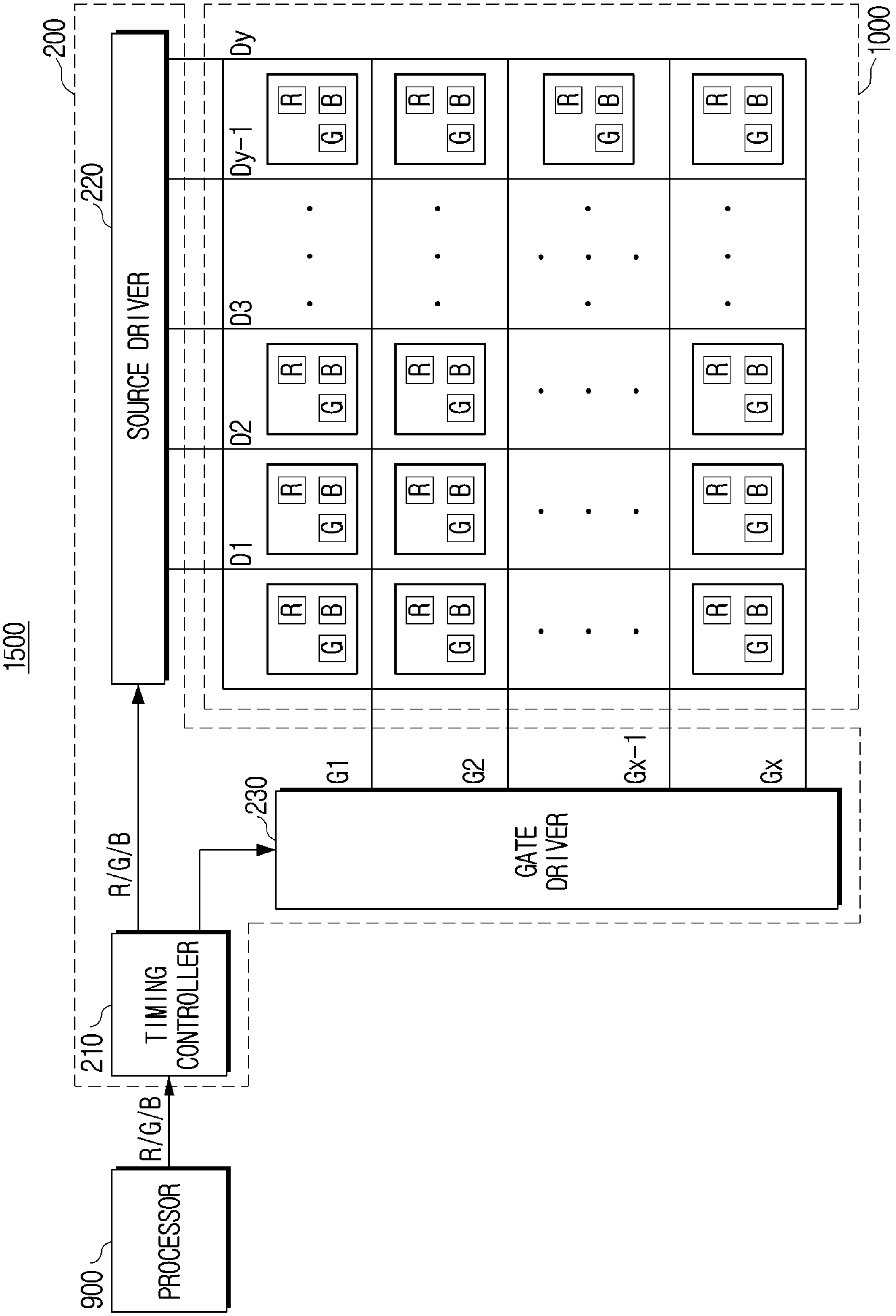
FIG. 12 is a configuration diagram of a display apparatus according to an embodiment.

FIG. 12 is a configuration diagram of a display apparatus according to an embodiment. Referring to FIG. 12, a display apparatus 1500 includes the display module 1000, a driving unit 200, and a processor 900.

The display module 1000 may include a plurality of pixels and each pixel includes a plurality of subpixels.

Specifically, the display module 1000 is formed in a matrix form so that scan lines (or gate lines) G1 to Gx and data lines D1 to Dy intersect each other and each pixel is formed in a region provided in the intersection.

In this case, each pixel includes three subpixels of R, G, and B, and as described above, each subpixel included in the display module 1000 may include the inorganic light emitting element 110 for a corresponding color, the constant current generator 120, and the PWM circuit 130.

Herein, the data lines D1 to Dy are lines for applying the data voltage (PAM data voltage, PWM data voltage or the like) to each subpixel included in the display module 1000 and the scan line G1 to Gx are lines for selecting a pixel (or subpixel) included in the display module 1000 for each line. Accordingly, the data voltage applied through the data line D1 to Dy may be applied to the pixel (or subpixel) of the scan line selected through the scan signal.

At that time, according to an embodiment of the disclosure, a data voltage to be applied to a pixel connected to each data line may be applied to each of data lines D1 to Dy. At that time, since one pixel includes a plurality of subpixels (e.g., R, G, and B subpixels), data voltages (that is, R data voltage, G data voltage, and B data voltage) to be applied to the subpixels R, G, and B included in one pixel may be time-divided and applied to each subpixel through one data line. The data voltages which are time-divided and applied through one data line as described above may be applied to each subpixel through a MUX circuit.

According to an embodiment, individual data line may be prepared for each of R, G, and B subpixels, and in this case, it is not necessary that the R data voltage, the G data voltage, and the B data voltage are time-divided and applied, and the corresponding data voltage may be applied to the corresponding subpixel through each data line at the same time.

Meanwhile, FIG. 11 illustrated only one set of scan lines such as G1 to Gx, for convenience of drawing. However, the number of actual scan lines may vary depending on a type of the subpixel and the driving method included in the display module 1000.

For example, as described above, in a case where the constant current generator 120 is implemented as the PAM circuit, one subpixel includes each of the PWM circuit 130 and the PAM circuit, and accordingly, the scan line for selecting the PWM circuit 130 and the scan line for selecting the PAM circuit are needed for each subpixel. Accordingly, in this case, two sets of scan lines may be prepared in the display module 1000.

The driving unit 200 drives the display module 1000 according to the control of the processor 900, and may include a timing controller 210, a source driver 220, a scan driver 230, a MUX circuit (not illustrated), a power circuit (not illustrated), and the like.

The timing controller 210 may receive an input of an input signal IS, a horizontal synchronization signal Hsync, and a vertical synchronization signal Vsync, a main clock signal MCLK, and the like from outside, generate an image data signal, a scan control signal, a data control signal, a light emitting control signal, and the like, and provide the signals to the display module 1000, the source driver 220, the scan driver 230, the power circuit (not illustrated), and the like.

In addition, the timing controller 210 may generate at least some of various signals illustrated in FIG. 8 and provide them to the display module 1000. In addition, the timing controller 210 may apply a control signal for selecting each of the R, G, and B subpixels, that is, a MUX signal to the MUX circuit (not illustrated). Accordingly, the plurality of subpixels included in the pixel of the display module 1000 may be respectively selected through the MUX circuit (not illustrated).

The source driver 220 (or data driver) is configured to generate a data signal and receives an image data of R/G/B component from the processor 900 and generate the data signal (e.g., PWM data signal, PAM data signal). In addition, the source driver 220 may apply the generated data signal to each subpixel circuit 110 of the display module 1000 through the data lines D1 to Dy. At that time, the PWM data voltage may be, for example, a voltage between −15 [V] corresponding to black gradation and −20 [V] corresponding to white gradation, but is not limited thereto.

The scan driver 230 (or gate driver) may generate various signals (e.g., signal SPWM[n], CCT of FIG. 8) for selecting a pixel arranged in a matrix form for each scan line (or gate line), and apply the generated signal to the display module 1000 through the scan lines G1 to Gx.

Particularly, according to an embodiment of the disclosure, the scan driver 230 may select all PWM circuits 130 included in the display module 1000 for each scan line in sequence, by applying each of the generated scan signals (or gate signals) to scan lines (or gate lines) connected to the PWM circuits 130 by scan line in sequence.

In addition, the scan driver 230 may generate scan signals (or gate signals) and apply the scan signals to the scan lines (or gate lines) connected to the constant current generators 120 (e.g., PAM circuits) at once, to select all constant current generators 120 included in the display module 1000 at once. However, the embodiment is not limited thereto.

The power circuit (not illustrated) may provide various power voltages (e.g., VDD, VOFF, and VGL) to the pixel circuit 110 included in the display module 1000.

Meanwhile, although not illustrated in the drawings, the driving unit 200 may include a clock providing circuit which provides a clock signal for driving each pixel included in the display module 1000, and may include a sweep signal providing circuit for providing the sweep voltage Vsweep described above to the PWM circuit 130.

Meanwhile, as will be described below with reference to FIGS. 14A to 15, all or some constituent elements included in the driving unit 200 such as the data driver 220, the scan driver 230, the power circuit (not illustrated), the MUX circuit (not illustrated), the clock providing circuit (not illustrated), the sweep signal providing circuit (not illustrated), and the like may be implemented to be included in a TFT layer formed on one surface of a substrate of the display module 1000, or may be implemented as a separate semiconductor IC and disposed on the other surface of the substrate.

All or some constituent elements of the driver unit 200 disposed on the other surface of the substrate may be connected to the PWM circuit 130 and the constant current generator 120 formed on the TFT layer through the internal wire. In addition, all or some constituent elements of the driver unit 200 may be implemented as a separate semiconductor IC and disposed on a main PCB together with the timing controller 210 or the processor 900, but the implementation example is not limited thereto.

The processor 900 controls general operations of a display apparatus 1500. Particularly, the processor 900 may drive the display module 1000 by controlling the driving unit 200.

For this, the processor 900 may be implemented as one or more of a central processing unit (CPU), a microcontroller, an application processor (AP), or a communication processor (CP), and an ARM processor.

Meanwhile, in FIG. 12, the processor 900 and the timing controller 210 have been described as separate constituent elements, but according to an embodiment, only one constituent element thereof may be included in the display apparatus 1500 and the included constituent element may perform the function of the other constituent element.

Figure 13A:
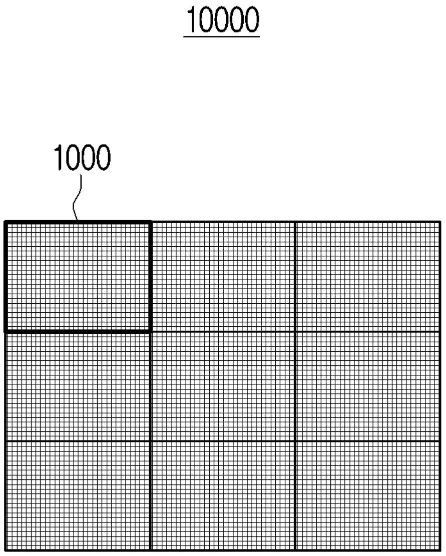
FIG. 13A is a diagram illustrating a display panel including a plurality of display modules according to an embodiment.

FIG. 13A is a diagram illustrating a display panel including a plurality of display modules according to an embodiment.

According to an embodiment of the disclosure, one display panel may be configured by combining a plurality of display modules 1000. FIG. 13A illustrates an embodiment in which nine display modules 1000 constitute one display panel 10000. In this case, the number of the display module 1000 constituting the display panel 10000 is not limited to nine. The display panel may be configured by combining various numbers of display modules 1000, for example, four or twelve display modules.

As described above, the PAM data voltage applied to all subpixels (accurately, all constant current generators 120) included in the display module 1000 at once may be a voltage having the same magnitude.

In other words, according to an embodiment of the disclosure, as illustrated in FIG. 7, since the PAM data voltage is applied to all subpixels included in the display module 1000 at once through one data line Vdata, the PAM data voltage having the same magnitude may be applied to the constant current generator 120 of each subpixel included in the display module 1000. That is, the same PAM data voltage may be applied to one display module 1000.

However, the application of the same PAM data voltage to all subpixels described above is limited to one display module 1000, and since the nine display modules 1000 illustrated in FIG. 13A includes their own data lines (Vdata signal wires) separately, even in a case where the PAM data voltage is applied at once, the PAM data voltages having different magnitude for each display module may be applied to each display module 1000 included in the display panel 10000.

As described above, chromaticity variation between modules occurring in the display panel 10000 may be compensated by applying the PAM data voltage for each display module.

For example, the chromaticity variation may occur between the display modules 1000, in a case of driving the display panel 10000 by applying the same PAM data voltage to all display modules 1000 of FIG. 13A. In this case, the chromaticity variation between the display modules 1000 may be compensated by adjusting the PAM data voltage applied to each display module.

Meanwhile, the compensation of chromaticity variation is not limited to the above example. According to another embodiment of the disclosure, as illustrated in FIG. 13B, one display module 10000 may be divided into a plurality of regions and the chromaticity variation may be compensated in units of the plurality of divided regions.

Figure 13B:
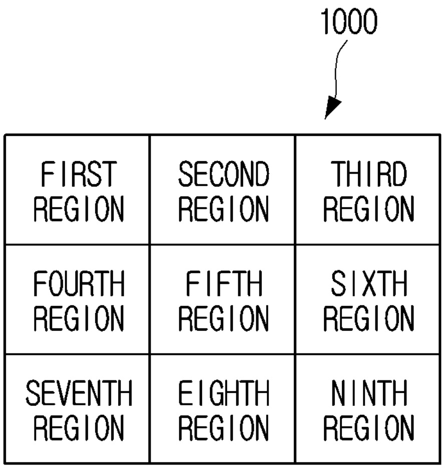
FIG. 13B is a diagram illustrating application of a PAM data voltage for each region in aa display module according to another embodiment.

FIG. 13B illustrates an embodiment in which one display module 1000 is divided into nine regions such as first region to ninth region. However, the embodiment is not limited thereto. The display modules 1000 may be, for example, divided into various numbers of regions such as four or twelve regions.

In this case, the PAM data voltages different for each region needs to be applied while applying the PAM data to all subpixels included in the display module 1000 at once, and for this, according to an embodiment of the disclosure, a separate data signal wire for applying the PAM data voltage may be provided for each divided region in the display module 1000.

As described above, the chromaticity variation occurring in one display module 1000 may be compensated by adjusting the PAM data voltage applied to the display module 1000 for each region through a separate data line provided for each divided region.

Figure 14A:
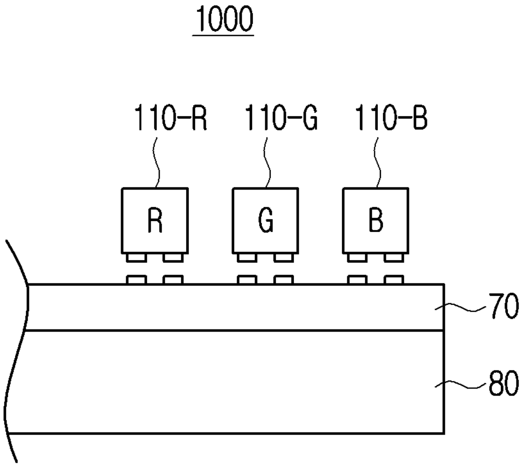
FIG. 14A is a cross-sectional view of the display module according to an embodiment.

FIG. 14A is a cross-sectional view of the display module according to an embodiment. FIG. 14A illustrates only one pixel included in the display module 1000, for convenience of description.

Referring to FIG. 14A, the display module 1000 includes a substrate 80, a TFT layer 70, and inorganic light emitting elements R, G, and B 110-R, 110-G, and 110-B. In this case, the constant current generator 120 and the PWM circuit 130 may be implemented as a thin film transistor (TFT) and included in the TFT layer 70 formed on the substrate 80.

Each of the inorganic light emitting elements R, G, and B 110-R, 110-G, and 110-B may be mounted on the TFT layer 70 to be electrically connected to the corresponding constant current generator 120 and the PWM circuit 130 to constitute the subpixel described above.

The substrate 80 may be implemented as a synthesis resin or glass and, according to an embodiment, may be implemented as hard material or a flexible material.

Particularly, according to an embodiment of the disclosure, all TFTs constituting the TFT layer 70 may be an N-type depletion mode oxide TFT. However, the embodiment is not limited thereto. For example, the TFT layer 70 may be implemented to include all or some of a LTPS TFT, a Si TFT (poly silicon, a-silicon), an organic TFT, a graphene TFT, and the like, or only a P-type (or N-type) MOSFET may be manufacturing in a Si wafer CMOS step and applied.

In a case of the oxide TFT, a reaction speed is faster than that of a-si TFT, and thus high resolution may be implemented sharply. In addition, since the reaction speed is fast, the integrating is possible, thereby manufacturing a bezel thin. In addition, a manufacturing step is simpler than that of LTPS TFT, thereby reducing the cost in production line construction. In addition, the uniformity is higher than that of LTPS, a separate crystallization process is not needed as for the LTPS, and therefore it is advantageous to manufacture a large-sized panel.

Meanwhile, FIG. 14A illustrates an example in which the inorganic light emitting elements R, G, and B 110-R, 110-G, and 110-B are flip chip type micro LEDs. However, the embodiment is not limited thereto, and according to an embodiment, the inorganic light emitting elements R, G, B 110-R, 110-G, 110-B may be a lateral type or vertical type micro LEDs.

Figure 14B:
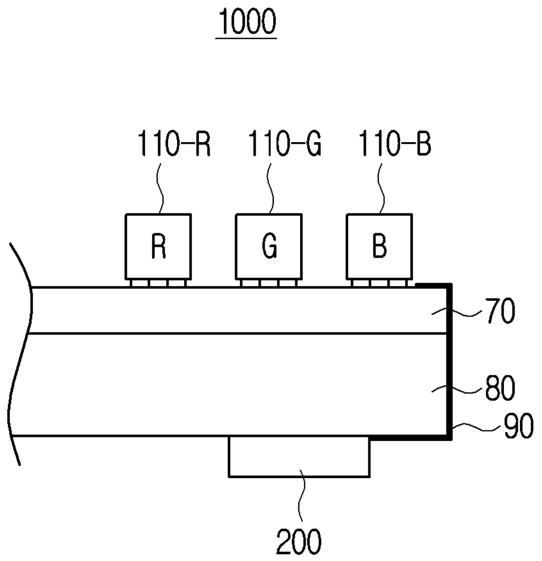
FIG. 14B is a cross-sectional view of the display module according to an embodiment.

FIG. 14B is a cross-sectional view of the display module according to an embodiment.

Referring to FIG. 14B, the display module 1000 may include the TFT layer 70 formed on one surface of the glass substrate 80, the inorganic light emitting elements R, G, and B 110-R, 110-G, and 110-B mounted on the TFT layer 70, the driving unit 200, and a connection wire 90 for electrically connecting the constituent elements included in the TFT layer 70 (e.g., PWM circuit 115 and constant current generator 120) to the driving unit 200.

As described above, the driving unit 200 including the timing controller 210, the source driver 220, the scan driver 230, the multiplex circuit (not illustrated), and the power circuit (not illustrated), and the like may be implemented on a substrate separate from the display module 1000.

FIG. 14B illustrates an example in which the driving unit 200 is disposed on a surface of the glass substrate 80 opposite to a surface on which the TFT layer 70 is formed. In this case, the circuits included in the TFT layer 70 may be electrically connected to the driving unit 200 through a connection ire 90 formed on an edge region of the TFT panel (hereinafter, the TFT layer 70 and the glass substrate 80 are collectively referred to as a TFT panel).

As described above, the reason for connecting the circuits included in the TFT layer 70 and the driving unit 200 by forming the connection wire 90 in the edge regions of the TFT panels 70 and 80 is because, if these are connected through a hole penetrating through the glass substrate 80, a problem regarding cracks generated on the glass substrate 80 may occur due to a difference in temperature between a manufacturing step of the TFT panels 70 and 80 and a step of filling the hole with a conductive material.

Meanwhile, according to an embodiment of the disclosure, the entire part or a part of the driving unit 200 may be implemented in the TFT layer 70 of the display module 1000. FIG. 15 illustrates such an embodiment.

Figure 15:
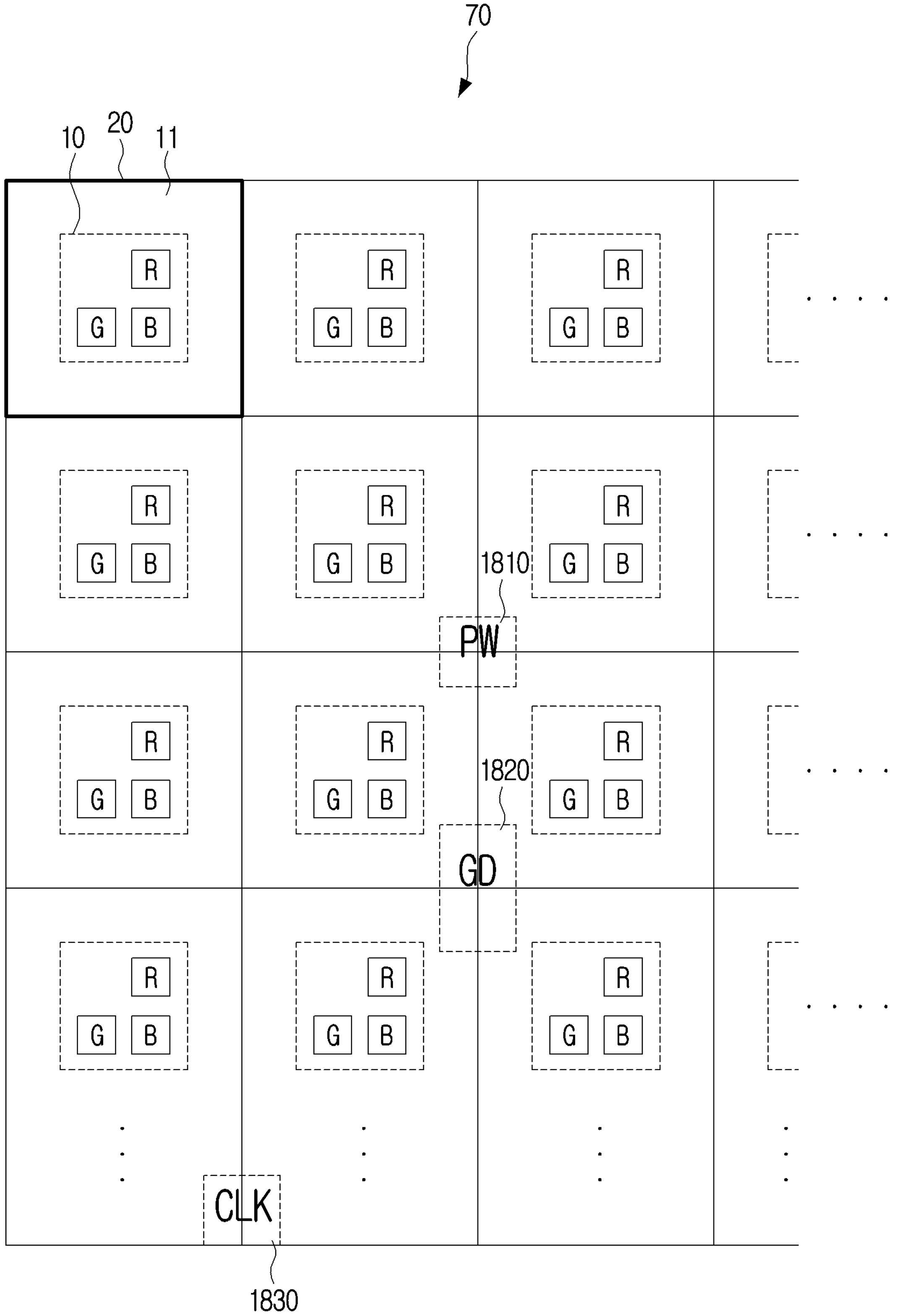
FIG. 15 is a plan view of a TFT layer according to an embodiment.

FIG. 15 is a plan view of a TFT layer according to an embodiment. Referring to FIG. 15, it is illustrated that, in the TFT layer 70, a pixel region 20 occupied by one pixel (or corresponding to one pixel) includes a region 10 in which the PWM circuit 130 and the constant current generator 120 of each of the R, G, and B subpixels are disposed, and a remaining peripheral region 11.

In this case, according to an embodiment of the disclosure, a size of the region 10 occupied by various circuits for driving the R, G, and B subpixels may be, for example, a size of approximately ¼ of the entire pixel region 20, but is not limited thereto.

As described above, since the remaining region 11 is present in the TFT layer 70, at least one of various circuits (e.g., the timing controller 210, the source driver 220, the scan driver 230, the MUX circuit (not illustrated), the power circuit (not illustrated), the clock providing circuit (not illustrated), and the sweep signal providing circuit (not illustrated)) included in the driving unit 200 may be implemented as a TFT and included in the remaining region 11.

FIG. 15 illustrates an example in which a power circuit 1810, a scan driver circuit 1820, and a clock providing circuit 1830 are implemented in the remaining region 11 of the TFT layer 70. In this case, the remaining circuits (e.g., the data driver circuit, the sweep signal providing circuit, and the like) of the driving unit 200 for driving the display module 1000 may be disposed on a separate substrate and connected to the circuits included in the TFT layer 70 through a side wire 90, as described above with reference to FIG. 14B.

However, FIG. 15 is merely an example, and the circuit that may be included in the remaining region 11 of the TFT layer 70 is not limited to those illustrated in FIG. 15. In addition, the position or size, and the number of the power circuit 1810, the scan driver circuit 1820, and the clock providing circuit 1830 illustrated in FIG. 15 are merely examples, and are not limited to those illustrated in the drawing.

In addition, according to an embodiment, the TFT layer 70 may further include a MUX circuit for selecting each of the plurality of subpixels constituting the pixel 10, an electro static discharge (ESD) protection circuit for preventing static electricity generating in the display module 1000, and the like.

The display module 1000 according to various embodiments of the disclosure may be installed and applied to a wearable device, a portable device, a handheld device, and various electronic products or devices where a display is required as a single unit. In addition, the plurality of display modules 1000 may be assembled and arranged to apply to a display apparatus such as a monitor for a personal computer (PC), a high-definition TV, a signage, an electronic display, or the like.

Figure 16:
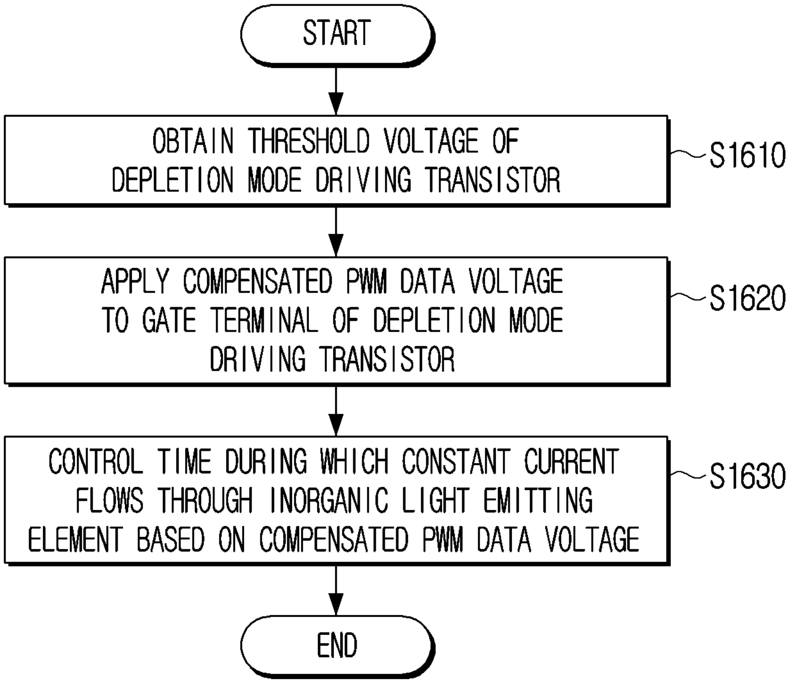
FIG. 16 is a flowchart illustrating a method for driving the display module according to an embodiment.

FIG. 16 is a flowchart illustrating a method for driving the display module according to an embodiment. In this case, in the display module 1000, the plurality of pixels each including the plurality of subpixels of different colors are arranged in a matrix form, and each of the plurality of subpixels includes the inorganic light emitting element 110, the constant current generator 120 for providing the constant current to the inorganic light emitting element, and the pulse width modulation (PWM) circuit 130 including the depletion mode driving transistor 131.

Referring to FIG. 16, the display module 1000 obtains a threshold voltage of the depletion mode driving transistor (S1610). At that time, the threshold voltage of the depletion mode driving transistor may be obtained from a source terminal of the depletion mode driving transistor while the depletion mode driving transistor operates as the source follower.

Accordingly, the display module 1000 applies a PWM data voltage compensated based on the obtained threshold voltage to a gate terminal of the depletion mode driving transistor 131 (S1620), and controls time during which the constant current flows through the inorganic light emitting element 110 based on the compensated PWM data voltage (S1630).

As described above, according to various embodiments of the disclosure, the threshold voltage of the driving transistor included in the pixel circuit may be efficiently and stably compensated. In addition, a change of a wavelength of light emitted by the inorganic light emitting element included in the display module according to the gradation may be prevented. Accordingly, a stain or color of the inorganic light emitting elements constituting the display module may be compensated, and also in a case of configuring a large-sized display panel by combining the plurality of display modules, a difference in luminance or color between display modules may be compensated. In addition, it is possible to obtain a more optimized design of the driving circuit, thereby driving the inorganic light emitting element more stably and efficiently.

Meanwhile, according to various embodiments of the disclosure, a method for driving the display module may be implemented as software including instructions stored in machine (e.g., computer)-readable storage media. The machine is an apparatus which invokes instructions stored in the storage medium and is operated according to the invoked instructions, and may include a display apparatus 1500 according to the disclosed embodiments.

In a case where the instruction is executed by a processor, the processor may perform a function corresponding to the instruction directly or using other elements under the control of the processor. The instruction may include a code made by a compiler or a code executable by an interpreter. The machine-readable storage medium may be provided in a form of a non-transitory storage medium. Here, the "non-transitory" storage medium is tangible and may not include signals, and it does not distinguish that data is semi-permanently or temporarily stored in the storage medium.

According to an embodiment, the method for driving the display module according to various embodiments disclosed in this disclosure may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product may be at least temporarily stored or temporarily generated in a storage medium such as a memory of a server of a manufacturer, a server of an application store, or a relay server.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display module comprising a plurality of pixels, wherein each of the plurality of pixels comprises a plurality of subpixels of different colors that are disposed in a matrix form, and wherein each of the plurality of subpixels comprises:

an inorganic light emitting element;

a constant current generator which provides a constant current to the inorganic light emitting element; and a pulse width modulation (PWM) circuit comprising a first depletion mode driving transistor and an internal compensation circuit to compensate a threshold voltage of the first depletion mode driving transistor, wherein the internal compensation circuit obtains the threshold voltage of the first depletion mode driving transistor corresponding to a difference between an input voltage inputted to a gate of the first depletion mode driving transistor and a voltage outputted from a source terminal while the first depletion mode driving transistor operates as a source follower, wherein the PWM circuit obtains a PWM data voltage in which the threshold voltage of the first depletion mode driving transistor is compensated, and controls a time during which the constant current flows through the inorganic light emitting element based on the compensated PWM data voltage, wherein the PWM circuit comprises a first capacitor connected between a gate terminal and the source terminal of the first depletion mode driving transistor and configured to receive a reference signal through a node A connecting the gate terminal of the first depletion mode driving transistor to the first capacitor, and a second capacitor connected between the gate terminal and the source terminal of the first depletion mode driving transistor and configured to receive a data signal through a node B connecting the second capacitor to the source terminal of the first depletion mode driving transistor and the first capacitor, and wherein one end of the second capacitor is directly connected to each of the node B, the first capacitor, and the source terminal of the first depletion mode driving transistor, and another end of the second capacitor is directly connected to each of the node A, the first capacitor, and the gate terminal of the first depletion mode driving transistor.

2. The display module according to claim 1, wherein the first capacitor comprises a first terminal and a second terminal, the first terminal of the first capacitor is connected to the source terminal of the first depletion mode driving transistor, and the second terminal is connected to the gate terminal of the first depletion mode driving transistor, the threshold voltage of the first depletion mode driving transistor is obtained through the first capacitor while a reference voltage is applied to the second terminal of the first capacitor and the gate terminal of the first depletion mode driving transistor, and the first depletion mode driving transistor operates as the source follower.

3. The display module according to claim 2, wherein the first depletion mode driving transistor operates as the source follower while a direct current (DC) voltage is applied to a drain terminal of the first depletion mode driving transistor, and wherein, based on a reference voltage being applied to the gate terminal of the first depletion mode driving transistor while the first depletion mode driving transistor operates as the source follower, a voltage of the source terminal of the first depletion mode driving transistor becomes a first voltage based on the reference voltage and the threshold voltage of the first depletion mode driving transistor.

4. The display module according to claim 3, wherein the first terminal of the first capacitor is connected to the gate terminal of the first depletion mode driving transistor and the second terminal of the PWM circuit to which the first voltage is applied and then the PWM data voltage is applied, and wherein, based on the PWM data voltage being applied to the second terminal of the first capacitor, the voltage of the gate terminal of the first depletion mode driving transistor becomes a second voltage based on the PWM data voltage and the threshold voltage of the first depletion mode driving transistor from the reference voltage.

5. The display module according to claim 4, wherein, based on the second voltage applied to the gate terminal of the first depletion mode driving transistor becoming the threshold voltage of the first depletion mode driving transistor by changing according to a sweep voltage which changes linearly and is applied through the second terminal of the first capacitor, the PWM circuit is configured to control the constant current generator to stop the constant current which flows through the inorganic light emitting element.

6. The display module according to claim 1, wherein the constant current generator comprises a pulse amplitude modulation (PAM) circuit, and wherein the PAM circuit comprises a second depletion mode driving transistor and is configured to control a magnitude of the constant current based on a PAM data voltage applied to a gate terminal of the second depletion mode driving transistor and a threshold voltage of the second depletion mode driving transistor.

7. The display module according to claim 6, wherein the threshold voltage of the second depletion mode driving transistor is obtained from a source terminal of the second depletion mode driving transistor while the second depletion mode driving transistor operates as a source follower.

8. The display module according to claim 7, wherein the second depletion mode driving transistor operates as the source follower while a direct current (DC) voltage is applied to a drain terminal, and wherein, based on a reference voltage being applied to the gate terminal of the second depletion mode driving transistor while the second depletion mode driving transistor operates as the source follower, a voltage of the source terminal of the second depletion mode driving transistor becomes a third voltage based on the reference voltage and the threshold voltage of the second depletion mode driving transistor.

9. The display module according to claim 8, wherein the constant current generator comprises a second capacitor comprising a first terminal connected to the gate terminal of the second depletion mode driving transistor and a second terminal to which the third voltage is applied and then the PAM data voltage is applied, and wherein, based on the PAM data voltage being applied to the second terminal of the second capacitor, the voltage of the gate terminal of the second depletion mode driving transistor becomes a fourth voltage based on the PAM data voltage and the threshold voltage of the second depletion mode driving transistor from the reference voltage.

10. The display module according to claim 9, wherein the fourth voltage is maintained in the gate terminal of the second depletion mode driving transistor, until a gate terminal voltage of the first depletion mode driving transistor changes according to a sweep voltage which changes linearly and is applied to the PWM circuit and a voltage between the gate terminal and the source terminal of the first depletion mode driving transistor becomes the threshold voltage of the first depletion mode driving transistor.

11. The display module according to claim 6, wherein the PWM data voltage is sequentially applied to the plurality of pixels disposed in the matrix form in a line unit, and wherein the PAM data voltage is applied to the plurality of pixels disposed in the matrix form at once.

12. The display module according to claim 6, wherein the display module is divided into a plurality of regions, and wherein the constant current generator is configured to receive the PAM data voltage for each of the plurality of regions.

13. The display module according to claim 6, wherein the display module is one of a plurality of display modules included in a display panel, and wherein a PAM data voltage applied to a first display module among the plurality of display modules and a PAM data voltage applied to a second display module among the plurality of display modules are different from each other.

14. The display module according to claim 1, wherein the constant current generator and the PWM circuit are formed in an oxide TFT layer on a substrate, and wherein the inorganic light emitting element is mounted on the TFT layer so as to be electrically connected to the constant current generator and the PWM circuit.

15. The display module according to claim 1, wherein the source terminal of the first depletion mode driving transistor included in the PWM circuit is connected to a gate terminal of a second depletion mode driving transistor included in the constant current generator.

16. The display module according to claim 1, wherein the display module is configured to:

in an initialization session, apply an initial voltage to the node A and the node B of the PWM circuit;

in a threshold extraction session, extract the threshold voltage of the first depletion mode driving transistor by applying a reference voltage to the node A of the PWM circuit and applying a DC voltage to a drain terminal of the first depletion mode driving transistor, and outputting a differential voltage between the reference voltage and the threshold voltage from the source terminal of the first depleting driving transistor; and in a data voltage setting session, set the PWM data voltage to a voltage of the gate terminal of the first depletion mode driving transistor by changing a voltage of the node B from the differential voltage to the PWM data voltage and changing a voltage of the node A from the reference voltage to a sum of the PWM data voltage and the threshold voltage.

17. The display module according to claim 1, wherein the data signal and the reference signal are received through two separate signal lines.

18. The display module according to claim 1, wherein the reference signal is directly through the node A connecting the gate terminal of the first depletion mode driving transistor to the first capacitor.

19. A method for driving a display module comprising a plurality of pixels, wherein each of the plurality of pixels comprises a plurality of subpixels of different colors that are disposed in a matrix form, and wherein each of the plurality of subpixels comprises an inorganic light emitting element, a constant current generator which provides a constant current to the inorganic light emitting element, and a pulse width modulation (PWM) circuit which comprises a first depletion mode driving transistor and an internal compensation circuit, wherein the PWM circuit comprises a first capacitor connected between a gate terminal and a source terminal of the first depletion mode driving transistor and configured to receive a reference signal through a node A connecting the gate terminal of the first depletion mode driving transistor to the first capacitor, and a second capacitor connected between the gate terminal and the source terminal of the first depletion mode driving transistor and configured to receive a data signal through a node B connecting the second capacitor to the source terminal of the first depletion mode driving transistor and the first capacitor, wherein one end of the second capacitor is directly connected to each of the node B, the first capacitor, and the source terminal of the first depletion mode driving transistor, and another end of the second capacitor is directly connected to each of the node A, the first capacitor, and the gate terminal of the first depletion mode driving transistor, and wherein the method comprises:

obtaining a threshold voltage of the first depletion mode driving transistor corresponding to a difference between an input voltage inputted to a gate of the first depletion mode driving transistor and a voltage outputted from the source terminal while the first depletion mode driving transistor operates as a source follower;

applying a PWM data voltage compensated based on the threshold voltage to the gate terminal of the first depletion mode driving transistor; and controlling a time during which the constant current flows through the inorganic light emitting element based on the compensated PWM data voltage.

* * * * *